(12) United States Patent
Bearman et al.

(10) Patent No.: US 8,583,745 B2
(45) Date of Patent: Nov. 12, 2013

(54) APPLICATION PLATFORM

(75) Inventors: Rob Bearman, Sammamish, WA (US);
Steve Bush, Redmond, WA (US);
Thomas Butcher, Seattle, WA (US);
Edward Jung, Bellevue, WA (US);
Sanjeev Katariya, Bellevue, WA (US);
Sami Khoury, Beijing (CN); Fajen Kyne, Littleton, MA (US)

(73) Assignee: OpenDesign, Inc., Bellevue, WA (US)

( * ) Notice: Subject to any disclaimer, the term of this patent is extended or adjusted under 35 U.S.C. 154(b) by 500 days.

(21) Appl. No.: 12/124,825

(22) Filed: May 21, 2008

(65) Prior Publication Data

US 2009/0077260 A1 Mar. 19, 2009

Related U.S. Application Data

(63) Continuation of application No. 11/865,588, filed on Oct. 1, 2007, now abandoned, which is a continuation of application No. 11/617,482, filed on Dec. 28, 2006, now abandoned, which is a continuation of application No. 11/429,655, filed on May 5, 2006, now abandoned, which is a continuation of application No. 11/223,827, filed on Sep. 9, 2005, now abandoned, which is a continuation of application No. 11/007,812, filed on Dec. 7, 2004, now abandoned, which is a continuation of application No. 10/774,759, filed on Feb. 9, 2004, now abandoned, which is a continuation of application No. 10/426,050, filed on Apr. 28, 2003, now abandoned, which is a continuation of application No. 10/228,176, filed on Aug. 26, 2002, now abandoned, which is a continuation of application No. 10/021,265, filed on Dec. 13, 2001, now abandoned.

(60) Provisional application No. 60/249,412, filed on Nov. 16, 2000, provisional application No. 60/268,386, filed on Feb. 12, 2001.

(51) Int. Cl.
*G06F 15/16* (2006.01)

(52) U.S. Cl.
USPC .................. 709/206; 709/203; 709/205

(58) Field of Classification Search
USPC .......... 709/217, 227–229, 238–245, 203–207
See application file for complete search history.

(56) References Cited

U.S. PATENT DOCUMENTS 5,721,904 A    2/1998    Ito et al.
5,751,914 A *   5/1998    Coley et al. ..................... 706/47

(Continued)

FOREIGN PATENT DOCUMENTS

EP            0817444        1/1998
JP            11-126177     5/1999

(Continued)

OTHER PUBLICATIONS

ITU-T X.200, Information Technology—Open Systems Interconnection—Basic Reference Model: the Basic Model, Nov. 7, 1994, International Telecommunication Union.*

(Continued)

*Primary Examiner* — Ruolei Zong
(74) *Attorney, Agent, or Firm* — Perkins Coie LLP

(57) ABSTRACT

A method and system for mapping logical identifiers to physical identifiers is provided. In one embodiment, a logical routing system allows each application, or more generally entity (e.g., user of an application), to register its logical identifier to physical identifier mapping when the application starts executing on a computer. To send a message to an application identified by a logical identifier, a client program uses the registered mapping to identify the physical identifier of the computer. If an application later starts executing on a different computer, then the application can register a different mapping.

20 Claims, 34 Drawing Sheets

(56) References Cited

U.S. PATENT DOCUMENTS

| | | | |
|---|---|---|---|
| 5,870,747 A | 2/1999 | Sundaresan et al. | |
| 5,878,218 A | 3/1999 | Maddalozzo, Jr. et al. | |
| 5,946,679 A * | 8/1999 | Ahuja et al. | 707/3 |
| 5,978,568 A | 11/1999 | Abraham et al. | |
| 6,003,083 A | 12/1999 | Davies et al. | |
| 6,021,113 A * | 2/2000 | Doshi et al. | 370/228 |
| 6,098,108 A | 8/2000 | Sridhar et al. | |
| 6,154,777 A * | 11/2000 | Ebrahim | 709/227 |
| 6,167,449 A | 12/2000 | Arnold et al. | |
| 6,192,394 B1 | 2/2001 | Gutfreund et al. | |
| 6,260,148 B1 * | 7/2001 | Aggarwal et al. | 726/14 |
| 6,314,469 B1 * | 11/2001 | Tan et al. | 709/245 |
| 6,360,256 B1 * | 3/2002 | Lim | 709/223 |
| 6,510,450 B1 | 1/2003 | Ricart et al. | |
| 6,513,061 B1 | 1/2003 | Ebata et al. | |
| 6,650,631 B1 * | 11/2003 | Benash et al. | 370/352 |
| 6,728,748 B1 * | 4/2004 | Mangipudi et al. | 718/105 |
| 6,760,775 B1 | 7/2004 | Anerousis et al. | |
| 6,826,559 B1 | 11/2004 | Ponte | |
| 7,389,322 B1 | 6/2008 | Miyazawa et al. | |
| 2002/0059452 A1 | 5/2002 | Yokota et al. | |
| 2002/0069238 A1 | 6/2002 | Eard et al. | |
| 2002/0073409 A1 | 6/2002 | Lundback et al. | |
| 2002/0178227 A1 | 11/2002 | Matsa et al. | |
| 2003/0225924 A1 | 12/2003 | Jung et al. | |

FOREIGN PATENT DOCUMENTS

| | | |
|---|---|---|
| JP | 11-205338 | 7/1999 |
| JP | 11-265402 | 9/1999 |

OTHER PUBLICATIONS

Tomlinson et al., Extensible Proxy Services Framework, Jul. 2000, IETF Network Working Group, tools.ietf.org/html/draft-tomlinson-epsfw-00.*

Approaches for resolving dynamic IP addressing Foo,S., Hui, S.C., Yip, S.W., & He, Y., (1997), Internet Research, 7(3), 208-216.

Held, Gilbert. "The Domain Name System", Managing TCP/IP Networks: Techniques, Tools and Security Considerations. John Wiliey & SonsLtd. (2000), pp. 89-110.

Mockapetris, P. Domian Names Concepts and Facilities. RFC 1034. Nov. 1987.

Peterson and Davie, "Computer Networks: A systems Approach", Morgan Kaufmann Publishers, Inc., 3rd edition (2003). pp. 19-29.

Peterson et al., "Computer Networks: A System Approach," vol. 2, Oct. 1, 1999, 13 pages.

* cited by examiner

| Logical Name (Routing) Table | | | 701 |
|---|---|---|---|
| Logical Identifier | F.Q. Logical ID | Class | Node ID Function |
|  |  |  |  |

*FIG. 7*

| Physical Routing Table | |
|---|---|
| Node ID | Peer Node ID |
| | |

| Peer Table | |
|---|---|
| Node ID | Network Address |
| | |

*FIG. 8*

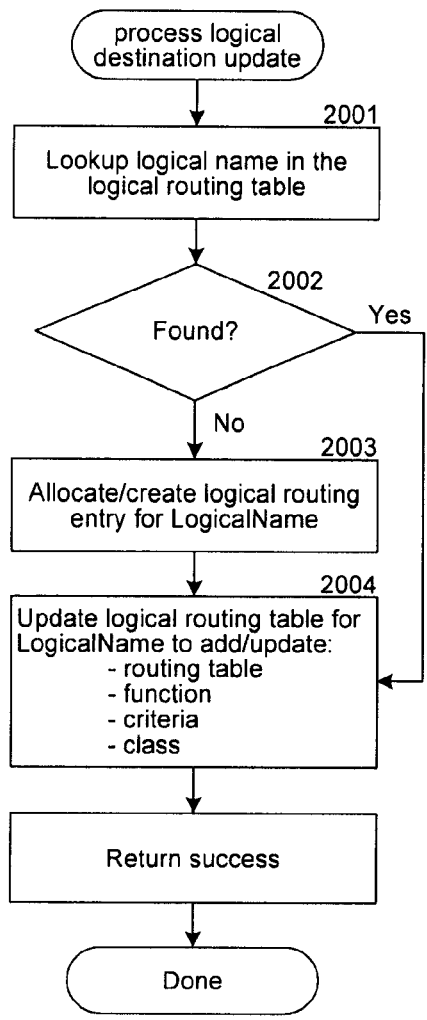

A logical update for a logical destination name will return
- the function for a logical destination
- the criteria element used to route to a logical destination
- the current value of the routing table for the logical destination
- the class (DB, APP, etc.) of the logical destination The class is used to generate the logical routing header associated with the logical destination

FIG. 20

APPLICATION PLATFORM

CROSS REFERENCE TO RELATED APPLICATION(S)

This application is a continuation of U.S. patent application Ser. No. 11/865,588, filed Oct. 1, 2007, which is a continuation of U.S. patent application Ser. No. 11/617,482, filed Dec. 28, 2006, which is a continuation of U.S. patent application Ser. No. 11/429,655, filed May 5, 2006, which is a continuation of Ser. No. 11/223,827, filed Sep. 9, 2005, which is a continuation of U.S. patent application Ser. No. 11/007,812 filed Dec. 7, 2004, which is a continuation of U.S. patent application Ser. No. 10/774,759 filed Feb. 9, 2004, which is a continuation of U.S. patent application Ser. No. 10/426,050 filed Apr. 28, 2003, which is a continuation of U.S. patent application Ser. No. 10/228,176 filed Aug. 26, 2002, which is a continuation if U.S. patent application Ser. No. 10/021,265 filed Nov. 16, 2001, entitled "APPLICATION PLATFORM," which claims the benefits of U.S. Provisional Application No. 60/249,412 entitled "APPLICATION PLATFORM" filed Nov. 16, 2000 and U.S. Provisional Application No. 60/268,386 entitled "LOGICAL ROUTING" filed Feb. 12, 2001. These applications are hereby incorporated by reference in their entirety.

BACKGROUND

The described technology generally relates to mapping of logical identifiers to physical identifiers.

Application programs such as a Web browser access resources using the HTTP protocol. The HTTP protocol uses a Uniform Resource Identifier ("URI") to identify a resource to be accessed. A URI is either a Uniform Resource Locator ("URL") or Uniform Resource Name ("URN"), or any other formatted string that identifies a network resource. URLs, as an example of URIs, are discussed in detail in T. Berners-Lee et al., *Uniform Resource Locators (URL)*, RVC 1738, CERN, Xerox PARC, Univ. of Minn., December 1994. Each URL contains a domain name identifying where the resource is located. For example, the URL "http://www.odi.com/home.htm" indicates that the resource named "home.htm" is located at the domain of "odi.com." The HTTP protocol uses an underlying transport layer such as TCP/IP to route messages to the computer associated with the domain name identified in the URL. The TCP/IP protocol, however, identifies computers using IP addresses (e.g., "128.32.0.6") rather than domain names. Various computer techniques have been developed to map logical identifiers, such as domain names, to physical identifiers, such as IP addresses.

One such technique is implemented by the domain name service ("DNS") that is provided as part of the TCP/IP protocol suite used by the Internet. DNS is a name service that maps domain names to IP addresses. When an application uses the HTTP protocol to send a message to a domain name, it at first requests a resolver program to resolve the domain name to its corresponding IP address. The resolver program accesses a hierarchy of domain name servers to resolve the domain name. The resolver program located at the computer where the application is executing requests a lowest-level domain name server to provide the IP address for the domain name. If that lowest-level domain name server does not have the IP address for that domain name, the domain name server forwards the request to the next higher-level domain name server. The request is propagated up the hierarchy of domain name servers until the IP address is found or until the authoritative domain name server for the first-level domain (e.g., ".com") is located. The authoritative domain name server maintains a mapping from the domain names to the IP addresses for all the domain names that have been registered for that first-level domain. The domain name servers that are lower in a hierarchy use a caching mechanism to maintain mappings from domain names to IP addresses that are provided by the authoritative domain name server. When a domain name is registered, it is assigned an IP address and a table of the authoritative domain name server is updated to reflect the mapping of that domain name to the IP address. The maintaining of mappings from domain names to IP addresses is provided by an administrative function of the authoritative domain name server. A user at the authoritative domain name server uses the administrative function to maintain the mappings.

A difficulty with the architecture of DNS is that the mapping of domain names to IP addresses is changed by an administrator at the authoritative domain name server. Another difficulty with the architecture is that a domain name maps to a single IP address. It would be desirable to have a technique for mapping logical identifiers to physical identifiers without the difficulties associated with DNS.

BRIEF DESCRIPTION OF THE DRAWINGS

FIG. 7 illustrates a data structure used by the logical routing layer in one embodiment.

FIG. 8 illustrates data structures used by the physical routing layer in one embodiment.

FIG. 20 is a flow diagram illustrating the processing of the process logical destination update function of the logical routing layer in one embodiment.

DETAILED DESCRIPTION

A method and system for mapping logical identifiers to physical identifiers is provided. In one embodiment, a logical routing system allows each application or entity (e.g., user of an application) to register its logical identifier to physical identifier mapping when the application starts executing on a computer. To send a message to an application identified by a logical identifier, a client program uses the registered mapping to identify the physical identifier of the computer. If an application later starts executing on a different computer, then the application can register a different mapping. In one embodiment, the logical routing system allows an application to register a function that is used to generate the physical identifier for the logical identifier associated with the application. The use of a function allows the mapping to physical identifier to vary based on various criteria, such as location of a client computer or workload balancing goals. The logical routing system also allows a logical identifier to map to multiple physical identifiers. With such a mapping, a client program would send a message to each of the computers identified by the multiple physical identifiers.

Figure 1:
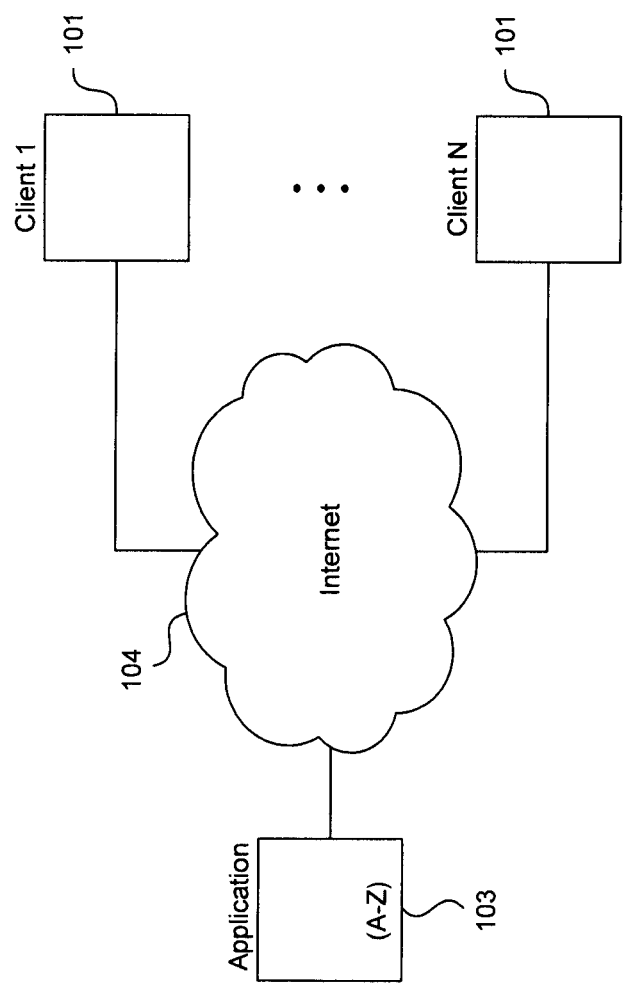
FIG. 1 is a block diagram for illustrating the logical routing system in one embodiment.

FIG. 1 is a block diagram for illustrating the logical routing system in one embodiment. The logical routing system is used to send messages between client computer systems 101 ("client nodes") and application computer systems 103 ("application nodes"). The computer systems are interconnected through a communications mechanism 104, such as the Internet. Applications executing at application nodes provide services to client programs executing at client nodes. The logical routing system provides a logical naming mechanism that allows client nodes to send messages to (e.g., requesting services of) applications by identifying the application by a logical identifier (also referred to as a "logical destination"), rather than a physical identifier (also referred to as a "node identifier"). For example, a logical identifier of an application may be "address book," whereas a physical identifier may be a globally unique identifier that uniquely identifies the node where the application is executing. (This description uses an "address book" as an example application. An address book application maintains a mapping of names (e.g., John Smith) of people to electronic mail addresses (e.g., JohnSmith@company.com). The address book application receives messages from client programs requesting an electronic mail address for a person and sends a response message to the client program that includes the electronic mail address.) When a client node (or more precisely, a computer program executing at the client node) wants to send a message to an application, it provides the message to a logical routing system along with the logical identifier of the application. The logical routing system identifies the appropriate physical identifier of the node where the application is executing and sends the message to that node. When an application starts its execution at an application node, it registers with the logical routing system. The logical routing system may maintain a mapping from logical identifiers of applications to physical identifiers of the application nodes where the applications are executing. A client node may identify the physical identifiers of an application from the logical identifier using this mapping. A logical identifier may map to multiple physical identifiers of different application nodes. For example, multiple copies of the address book application may be executing at different application nodes to accommodate the demands of the client program. When a client program wants to retrieve an address, then the logical identifier of the retrieve address function might map to only one physical identifier. In contrast, when a client program wants to insert an address, then the logical identifier of the insert address function might map to all the physical identifiers of nodes where the application is executing. The logical routing system thus provides a mechanism that allows client programs to be developed using logical identifiers of applications and allows the logical identifiers to be resolved to physical identifiers during execution of the client programs. One skilled in the art would appreciate that a program executing at a node can be both an application and a client program in that it may respond to requests for services from client programs and request services from other applications.

Applications register themselves with the logical routing system to map their logical identifiers to physical node identifiers. The logical routing system may maintain a logical routing map of these registrations. The logical routing system can implement the logical routing map across the application nodes and client nodes in a distributed manner, can implement the logical routing map as a central system, or can implement the logical routing map by a combination of distributed and centralized systems. When an application registers with the logical routing system, a register message may be sent to a logical destination that identifies the logical routing map (e.g., "logical routing map"). Similarly, when a client program sends a message to an application, the logical routing system may send a message to the same logical destination to retrieve the physical identifiers of the application. More generally, the logical routing map may be considered to be an "application" that is not only used by the logical routing system, but is also accessible through the logical routing system itself.

In one embodiment, the logical routing map has a node identification function for each logical name that returns the node identifier of the node associated with that logical name. When the application associated with a logical name registers with the logical routing system, the application provides its node identification function to the logical routing system. The node identification function may input parameters or criteria (e.g., the message to be sent) and returns the appropriate node identifier for those parameters or criteria. For example, applications associated with a logical name may be executing at nodes physically located on each continent. The node identification function may input the country where the sending node is located and return the node identifier for the node located on the continent in which the country is located.

Figure 2:
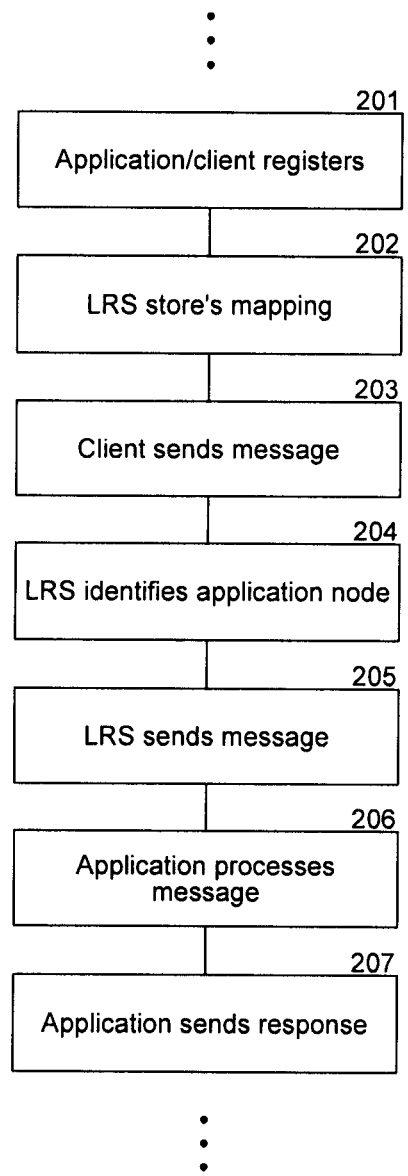
FIG. 2 is a flow diagram illustrating the processing when a client program sends a message to an application.

FIG. 2 is a flow diagram illustrating the processing when a client program sends a message to an application. In block 201, an application when it starts execution registers its logical identifier and the physical identifier of the node at which it is currently executing with the logical routing system. (Client programs register in a similar way.) In one embodiment, rather than registering the actual physical identifier, a node identification function is registered. Whenever the physical identifier is needed, the node identification function is invoked, passing the message to be sent, and returns one or more physical identifiers. For example, the address book application may register a node identification function that maps the last name of a person to the physical identifier of the node that is executing the instance of the application that is responsible for servicing requests with that last name. In block 202, the logical routing system stores the mapping of logical identifier to physical identifier for the application. In block 203, the client program invokes the logical routing system to send a message to an application identified by a logical identifier. In block 204, the logical routing system identifies the physical identifier using the logical routing mapping. The logical routing system at the client node invokes the node identification function passing the message. The node identification function returns the physical identifier associated with an instance of application. The logical routing system sends the message to the node addressed by that physical identifier. The logical routing system at the application node, upon receiving the message, may determine whether the message should be forwarded to another node or processed by this node. The logical routing system may use a node identification function to identify the node that is to process the message. In block 206, assuming that the message is to be processed at this node, the application processes the message. In block 207, the application sends a response to the client node using the logical routing system. The logical routing system may also send an updated node identification function to the client node. The client node receives the response and the updated notification of function. The logical routing system at the client node passes the response to the client program and uses the updated node identification function when sending subsequent messages to the logical identifier. The updated node identification function may reflect the changing architecture of how the application is distributed across multiple application nodes.

Figure 3:
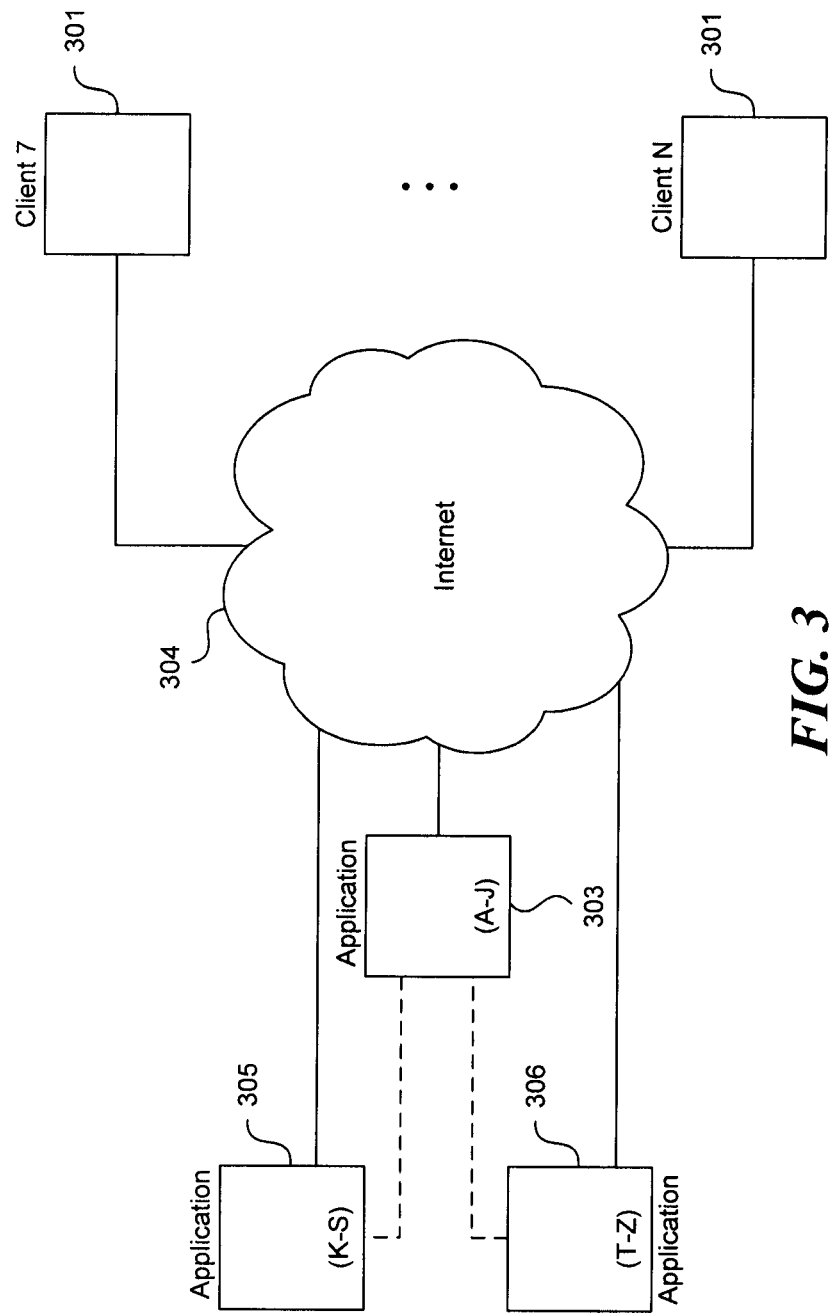
FIG. 3 is a block diagram for illustrating the logical routing system where instances of the application are executing at multiple nodes.

FIG. 3 is a block diagram for illustrating the logical routing system where instances of the application are executing at multiple nodes. The application is executing at application nodes 303, 305 and 306. The application was initially executing only one instance at application node 303. As the demand for the address book services increased, application nodes 305 and 306 were brought online and started executing instances of the application. The application node 303 services requests for names beginning with the letters A-J, application node 305 services requests for names beginning with the letters K-S, and application node 306 services requests for names beginning with the letters T-Z. Continuing with the example of FIG. 2, when the client program wants to request an address for "John Smith," the logical routing system uses the node identification function for the logical identifier of "address book," which identifies application node 303. The logical routing system sends the request to application node 303. When the logical routing system at application node 303 receives the request, it uses its node identification function to identify application node 305. The logical routing system of application node 303 forwards the request to application node 305, where the logical routing system provides the message to the application. The instance of the application executing at application node 305 retrieves the electronic mail address and sends the address to the client node. The logical routing system of application node 305 may also send to the client node an updated node identification function that maps names beginning with the letters A-J to application node 303, names beginning with the letters K-S to application node 305 and names beginning with the letters T-Z to application node 306. In this way, when the logical routing system of the client node next uses the updated node identification function, it will identify the appropriate application node that is responsible for servicing the request and send the request directly to the identified application node. Alternatively, if application node 305 does not send an updated node identification function, then subsequent requests will be routed through application node 303. If multiple instances of an application provide the same capabilities, then the node identification function may select the physical identifier of an instance randomly, may select the physical identifier based on geographic proximity to the client node, and so on.

Figure 4:
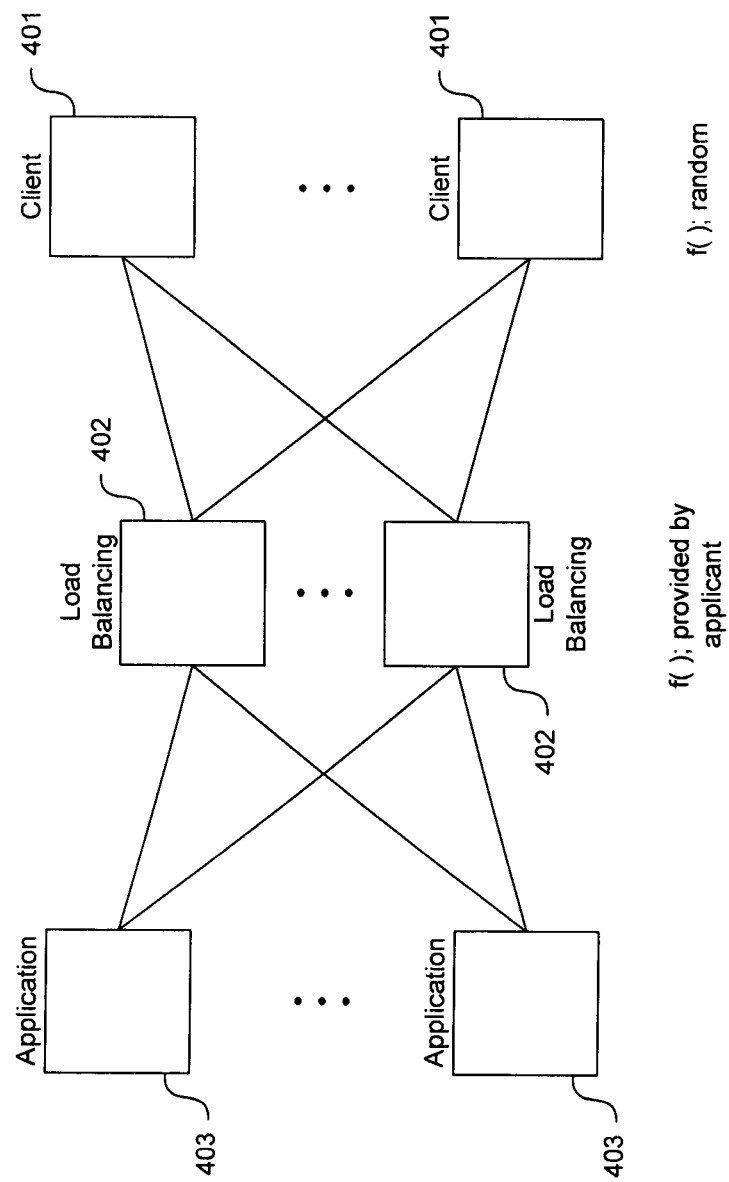
FIG. 4 is a block diagram illustrating use of the node identification function to effect load balancing for an application.

FIG. 4 is a block diagram illustrating use of the node identification function to effect load balancing for an application. The client nodes 401 use a node identification function that maps to one of the load balancing nodes 402. For example, the node identification function may randomly select one of the load balancing nodes. The node identification function used by the client nodes may be provided by the load balancing nodes. When a load balancing node receives a request from a client node, it uses a different node identification function provided by the application to identify the application node 403 that is to service the request. For example, there may be multiple instances of the address book application that services requests for names beginning with the letters A-J. Each load balancing node can decide in which of those instances to send a request.

Figure 5:
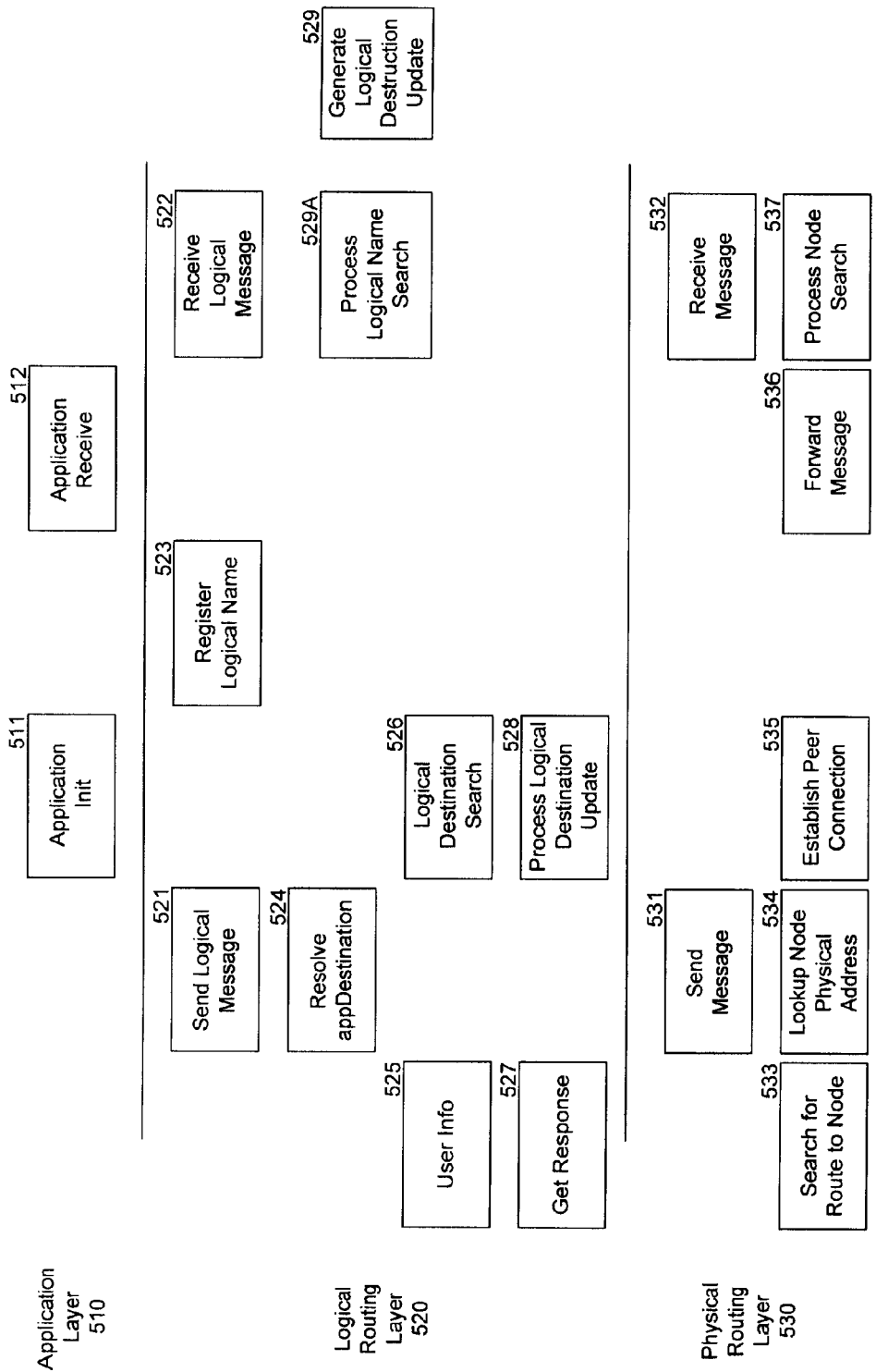
FIG. 5 is a block diagram illustrating the architecture of the application layer 510, the logical routing layer 520 and the physical routing layer 530 used by the logical routing system.

FIG. 5 is a block diagram illustrating the architecture of the application layer 510, the logical routing layer 520 and the physical routing layer 530 used by the logical routing system. The logical routing system corresponds to the functionality provided by the logical routing layer in one embodiment. The physical routing layer is responsible for sending a message to a node identified by a node identifier. Each node in the network is assigned a unique node identifier. The physical routing layer provides a send message component 531 and a receive message component 532. The logical routing layer sends messages using the send message component and receives messages via the receive message component. The send message component is passed a message and a destination node identifier and locates the network address (e.g., IP address and port) for that destination node identifier. The send message component then invokes the underlying transport layer, such as TCP/IP, to deliver the message to the network address. The send message component may request a physical routing map to provide the network address for the destination node identifier or may request other nodes to which it is connected (i.e., peer nodes) if they know of the network address for the destination node. The send message component may cache the network address in a physical routing table for use when sending subsequent messages to that destination node. The send message component then sends the message to that network address. The message may be sent by establishing a direct connection between the originating node and the destination node, by forwarding the message to the destination node via a peer node of the originating node, or by sending a message to a physical routing server for forwarding to the destination node. The send message component uses a "search for route to node" component 533, a lookup node component 534 and establish peer connection component 535, as described below in more detail. The receive message component processes messages that are received for a destination node. If this node (i.e., the node where a component is executing) is not the destination node, then the receive message component attempts to forward the message to the destination node. If the message indicates that an originating node is searching for a path to a destination node, then this node either responds to the search request, if it knows a path to the destination node, or forwards the search request to its peer nodes. If the message is intended for processing at this node, then the receive message component passes the message to the logical routing layer by invoking the receive logical message component 522 or the process logical name search component 529A.

The logical routing layer provides a send logical message component 521, a receive logical message component 522, a register logical name component 523 and a process logical name search component 529A. The application layer sends messages to a logical destination, which may be an application or a user, using the send logical message component and receives response messages from the logical destination via the receive logical message component. The send logical message component is passed a logical identifier and a message, identifies the destination node identifier for the logical identifier, and uses the send message component of the physical routing layer to send the message to the destination node. The send logical message component may identify the destination node identifier using a node identification function provided by a central server, by a search of peer nodes, or by the logical destination itself. The send logical message component may cache the mapping of the logical identifier to the node identification function. The send logical message component uses a resolve logical destination component 524, a user information component 525, a logical destination search component 526, a get response component 527, and a process logical destination update component 528 that are described below in detail. The receive logical message component is invoked by the receive message component of the physical routing layer to pass the message to the logical routing layer. The receive logical message component processes the message and provides the message to the application layer. The register logical name component is used by the application layer to register a logical identifier with the logical routing layer. The generate logical destination update component is invoked by the process logical name search component. The application layer may provide an application initialization component 511 and an application receive component 512. The application initialization component may register the application's logical identifier with the logical routing layer. The application receive component is invoked by the receive logical message component to effect the passing of the message from the logical routing layer to the application layer. The application layer also invokes the send logical message to send messages to a logical destination.

The logical routing system may execute on computer systems that include main memory, a central processing unit, input devices (e.g., keyboard and pointing devices), output devices (e.g., display devices) and a hard drive. The main memory and hard drive are computer-readable media that may contain instructions that implement the logical routing system. The computer systems may be interconnected via various communication channels that include the Internet, a wide area network, a point-to-point dial-up connection, or a local area network.

Figure 6:
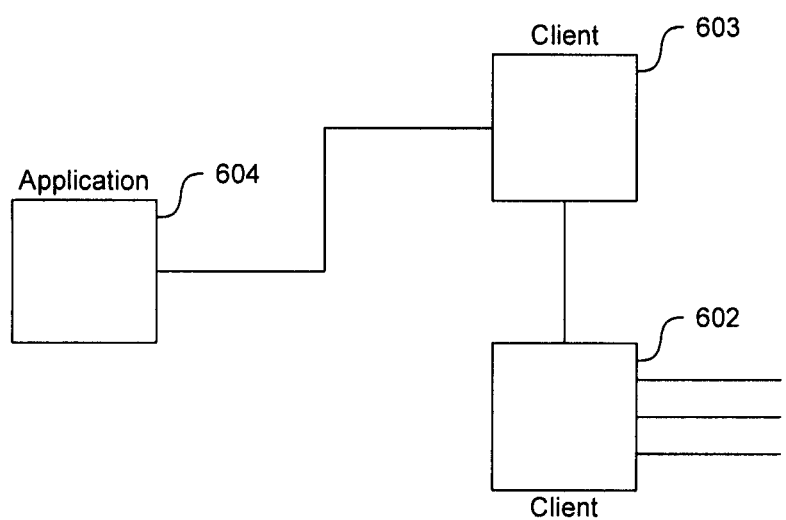
FIG. 6 is a block diagram illustrating connections at the physical routing layer between various nodes.

FIG. 6 is a block diagram illustrating connections at the physical routing layer between various nodes. In this example, client node 602 is connected to client node 603, and client node 603 is connected to application node 604. When the physical routing layer of client node 602 is to send a message to application node 604, which is identified by a destination node identifier, the send message component may attempt to establish a direct connection with the application node. However, if a connection cannot be established, then the send message component of client node 602 determines whether the application node is accessible through any of its peer nodes. In this case, application node 604 is accessible to client node 602 via client node 603. Thus, the client node 602 forwards the message to client node 603, which in turn forwards the message to application node 604.

FIG. 7 illustrates a data structure used by the logical routing layer in one embodiment. The logical name table 701 (also referred to as a logical routing table) contains an entry for each logical name associated with an application executing at the node. A logical name is a logical identifier that identifies an application. A logical identifier may also identify a user or some other logical destination. Each entry includes a logical identifier, a fully qualified logical identifier, a class and a node identification function. The fully qualified logical identifier uniquely identifies the logical name associated with the application. The class identifies a message class of the logical destination. For example, the class may be database, application or user. A logical identifier is unique within a class. The node identification function is used by client nodes to identify the node identifier to which a message for the logical name should be sent. Each entry may also include a function name which identifies a function supported by the application. For example, a function name of an address book application for inserting a new entity may be "insert address." The logical name table contains an entry for each logical destination known to this node. The logical name table may also contain mapping of user names to user identifiers. The user name is the logical name. The fully qualified logical name is the user identifier that uniquely identifies the user. There may be more than one user name associated with a user identifier. In an alternate embodiment (described below), the logical routing table includes a key function, criteria declaration, and route table. The criteria defines the data to be passed to the key function to generate a key. The key is then used to locate the node identifier from the route table.

FIG. 8 illustrates data structures used by the physical routing layer in one embodiment. The data structures of the physical routing layer include a physical routing table 801 and a peer table 802. The physical routing table contains an entry for each node identifier known to this node. Each entry maps the node identifier to the peer node identifier through which the node identifier is accessible. The peer table contains an entry for each peer node of this node. Each entry maps the node identifier to the network address of the peer node.

Figure 9A:
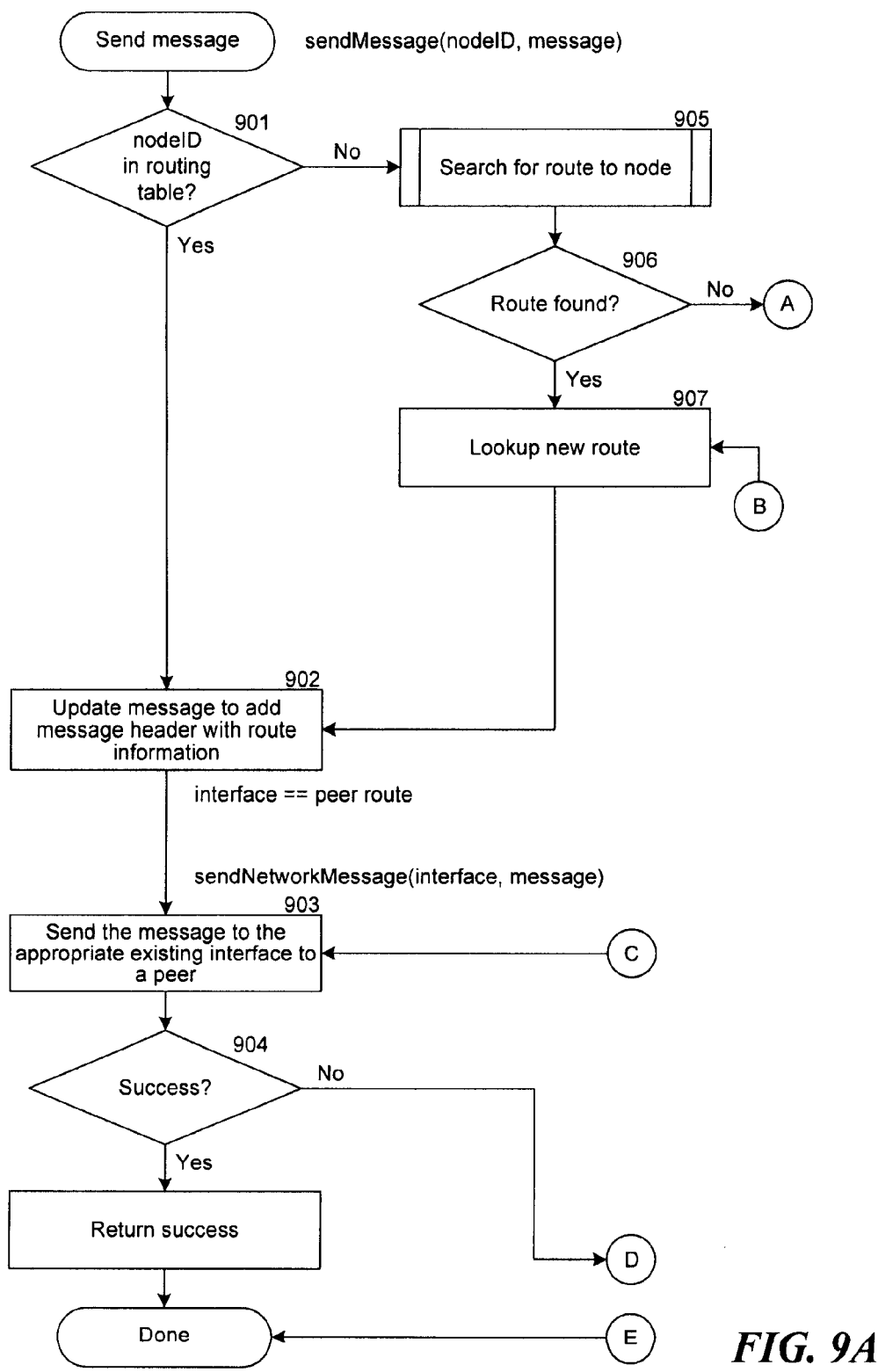
FIG. 9 is a flow diagram illustrating the processing of the send message function of the physical routing layer in one embodiment.
Figure 9B:
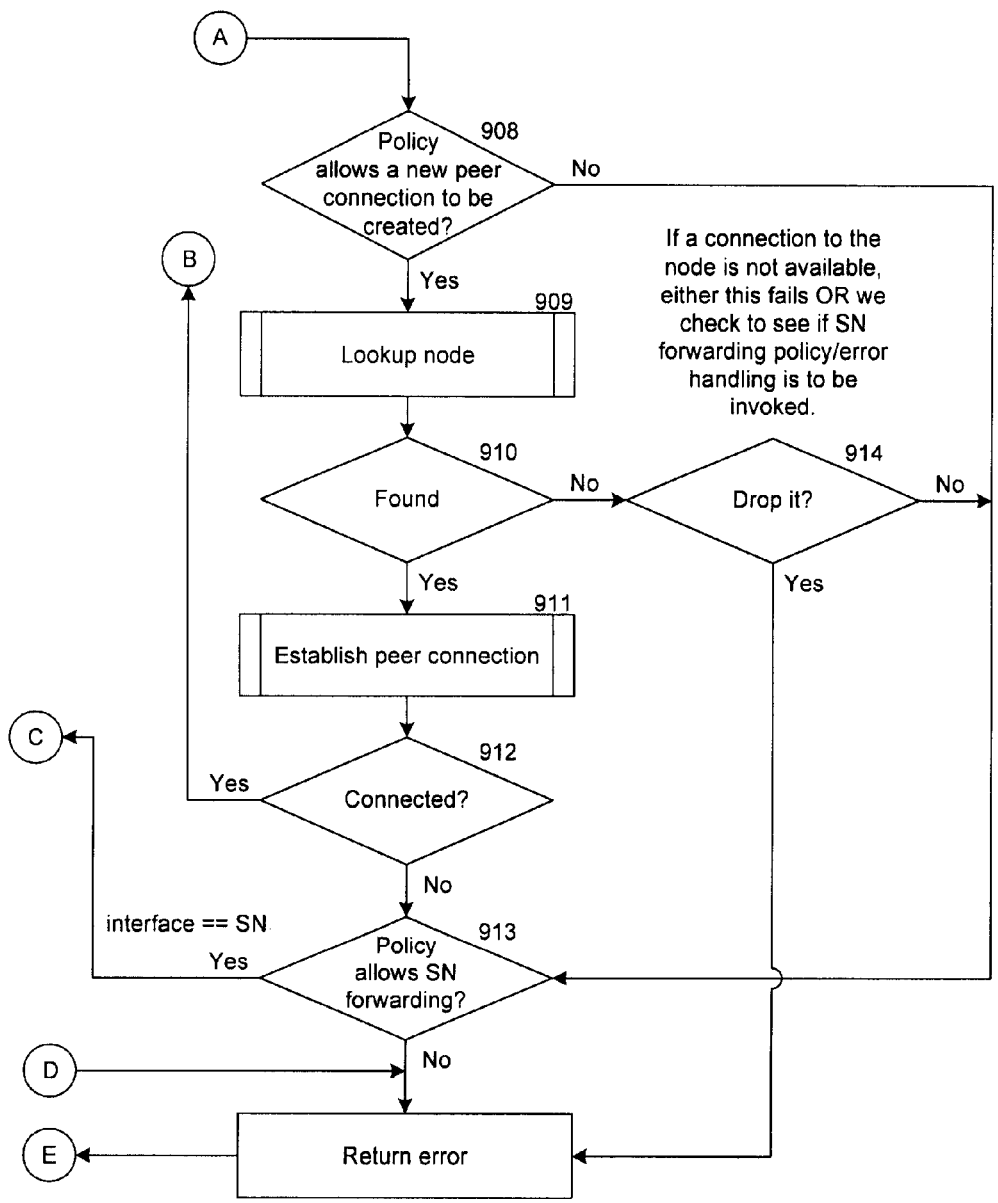

FIGS. 9-15 are flow diagrams illustrating the processing of the physical routing layer in one embodiment. FIGS. 9-12 illustrate the send processing of the physical routing layer. FIG. 9 is a flow diagram illustrating the processing of the send message function of the physical routing layer in one embodiment. The function is passed a destination node (i.e., component) identifier and a message and sends the message to the identified destination node. This function is invoked by the logical routing layer. In decision block 901, if an entry for the destination node identifier is in the physical routing table, then a route to the destination node has previously been identified and the function retrieves that entry and continues at block 902, else the function continues at block 905. In block 902, the function adds to the header of the message route information that includes the node identifier of this node. When a message is received by a node, it will have a history of the nodes on the path traveled so far. The receiving node can update its physical routing table to indicate that the nodes on that path are accessible. In block 903, the function retrieves the node identifier of the peer node from the entry and then retrieves the network address (e.g., the IP address and port number) for that peer node from the peer table. The function then sends the message to the retrieved network address. In decision block 904, if sending the message was successful, then the function returns an indication of success, else the function returns an indication of error. Blocks 905-914 are performed when an entry for the passed node identifier is not in the physical routing table. These blocks attempt to find a route through which the message can be sent to the destination node. In block 905, the function invokes the "search for route to node" function, which searches for a peer node through which the destination node is accessible. If the invoked function finds such a peer node, then it adds an entry to the physical routing table and returns an indication of success. In decision block 906, if a route was found, then the function continues at block 907, else the function continues at block 908. In block 907, the function retrieves the entry for the destination node from the physical routing table and continues at block 902 to send the message to the destination node. In decision block 908, if the policy for this node allows for a new peer connection to be created, then the function continues at block 909, else the function continues at block 912. An example policy may limit the number of connections to peer nodes to four. If this node already has four peer nodes, then the policy prevents connection to a fifth peer node. In block 909, the function invokes the lookup node function, which identifies the network address for the destination node and adds it to the peer table. The invoked function may send a message to a server node to see if the destination node has registered with the server node. The invoked function also adds an entry to the peer table to store the node identifier and network address for the destination node. In decision block 910, if the destination node was found, then the function continues at block 911, else the function continues at block 914. In block 911, the function invokes the establish peer connection function to establish a peer connection with the destination node and to update the physical routing table. In decision block 912, if a connection is established to the destination node, then the function continues at block 907 to send the message directly to the destination node, else the function continues at block 913. In decision block 913, if the policy of this node allows for server node forwarding, then the function continues at block 903 to forward the message to the server node, else the function returns an indication of error. When server node forwarding is allowed, this node sends the message to the server node so that the server node can forward the message to the destination node either now if the destination node is online or later when the destination node comes online. In decision block 914, if the message should be dropped, then the function returns an indication of error, else the function continues in block 913.

Figure 10:
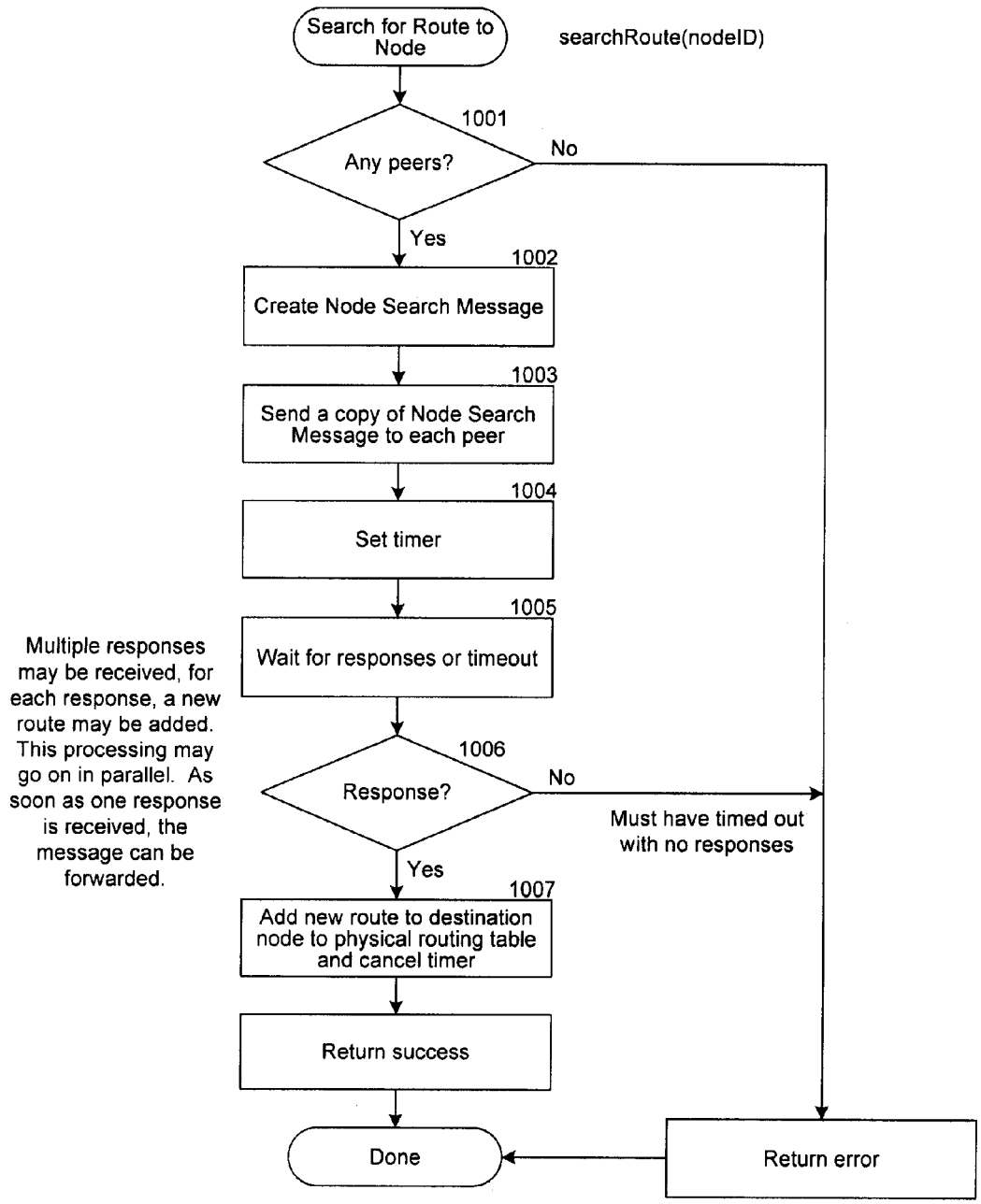
FIG. 10 is a flow diagram illustrating the processing of the "search for route to node" function in one embodiment.

FIG. 10 is a flow diagram illustrating the processing of the "search for route to node" function in one embodiment. The function is passed the node identifier of the destination node. The function is invoked to identify a path from a peer node of this node to the destination node. The function sends a message to each peer node of this node indicating that this node is searching for a path to the destination node. A peer node responds to the message when it has identified a path through the peer node to the destination node. One skilled in the art will appreciate that different searching techniques may be used. For example, the messages may be sent to the peer nodes so that each peer node can attempt to identify a path before a message is sent to the next peer node, rather than initially sending a message to each peer node. In decision block 1001, if this node has any peer nodes, then the function continues at block 1002, else the function returns an indication of error. In block 1002, the function creates a node search message that includes the identifier of this node and the destination node. In block 1003, the function sends a copy of the node search message to each peer node of this node. In block 1004, the function sets a timer to limit the time that this node waits for a response from a peer node. In block 1005, the function waits for a response from a peer node or for a timeout. In decision block 1006, if a response was received, then the function continues at block 1007, else the timeout occurred and the function returns an indication of error. In block 1007, the function updates the physical routing table by adding an entry to indicate that the destination node is accessible through the peer node that sent the response. The function cancels the timer and then returns an indication of success.

Figure 11:
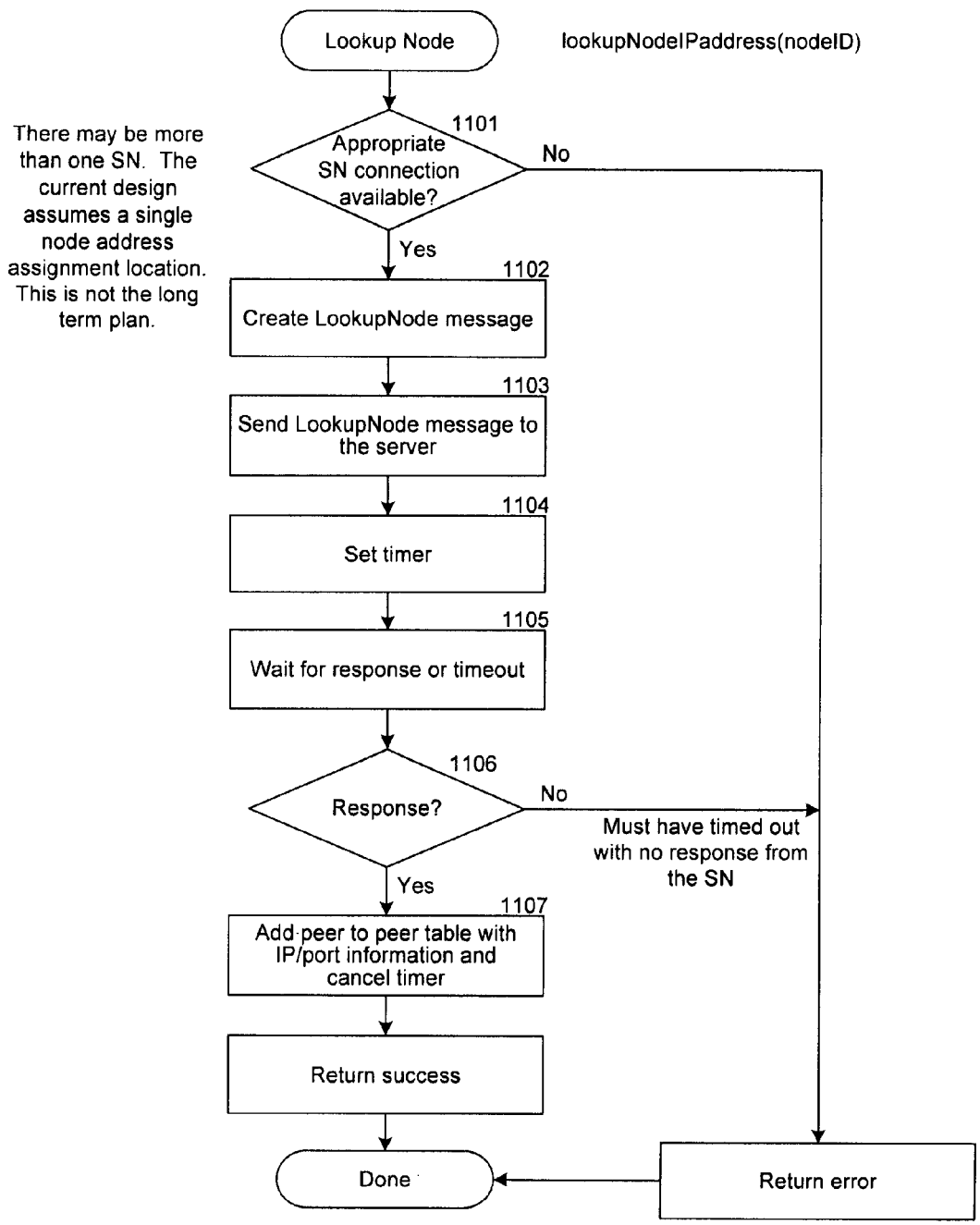
FIG. 11 is a flow diagram illustrating the processing of the lookup node function in one embodiment.

FIG. 11 is a flow diagram illustrating the processing of the lookup node function in one embodiment. This function is passed the node identifier of the destination node. The function contacts the server node to retrieve the network address for the destination node and adds an entry to the peer table if the server node responds with the network address of the destination node. In decision block 1101, if the appropriate connection to the server node is available, then the function continues at block 1101, else the function returns an indication of error. In block 1102, the function creates a lookup node message that includes the destination node identifier. In block 1103, the function sends the lookup node message to the server node. In block 1104, the function sets a timer. In block 1105, the function waits for a response from the server node or a timeout. In decision block 1106, if a response is received from the server node, then the function continues at block 1107, else a timeout has occurred and the function returns an indication of error. In block 1107, the function adds an entry to the peer table that indicates the network address of the destination node, which was returned in the message. The function cancels the timer and then returns an indication of success. In an alternate embodiment, if the server node is not available through this node, then this node may request its peer nodes to contact the server node on its behalf or may check locally cached information relating to the network address of various nodes.

Figure 12A:
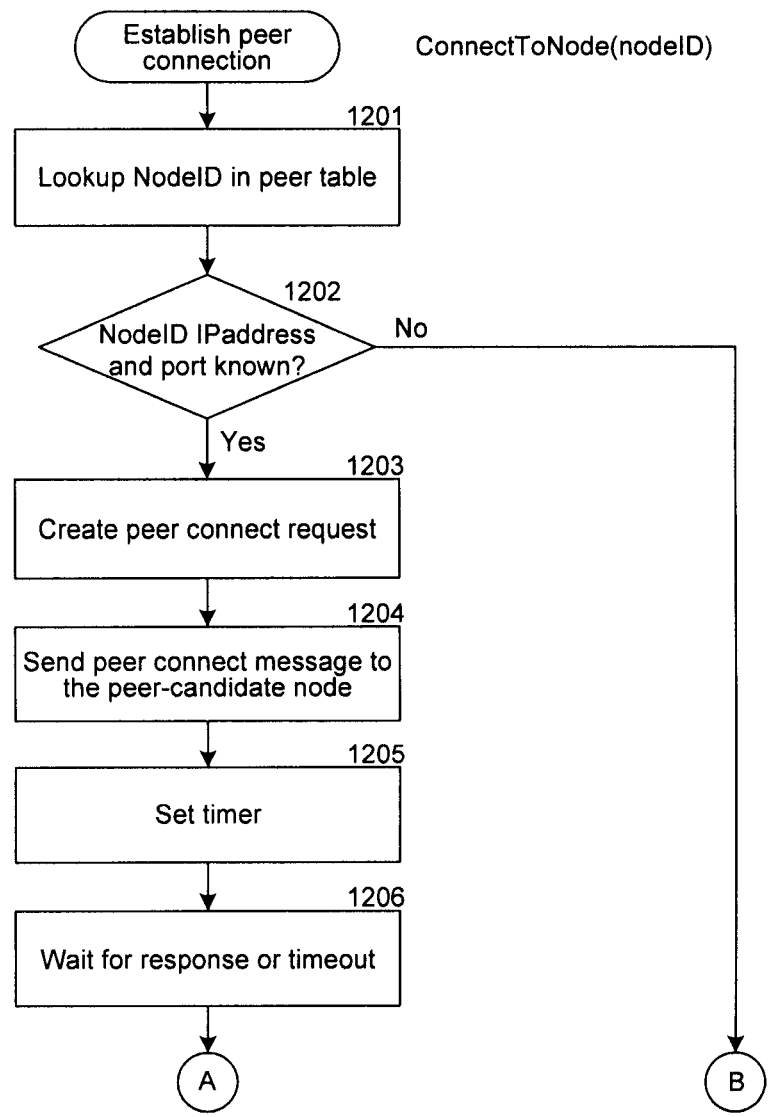
FIG. 12 is a flow diagram illustrating the processing of the establish peer connection function in one embodiment.
Figure 12B:
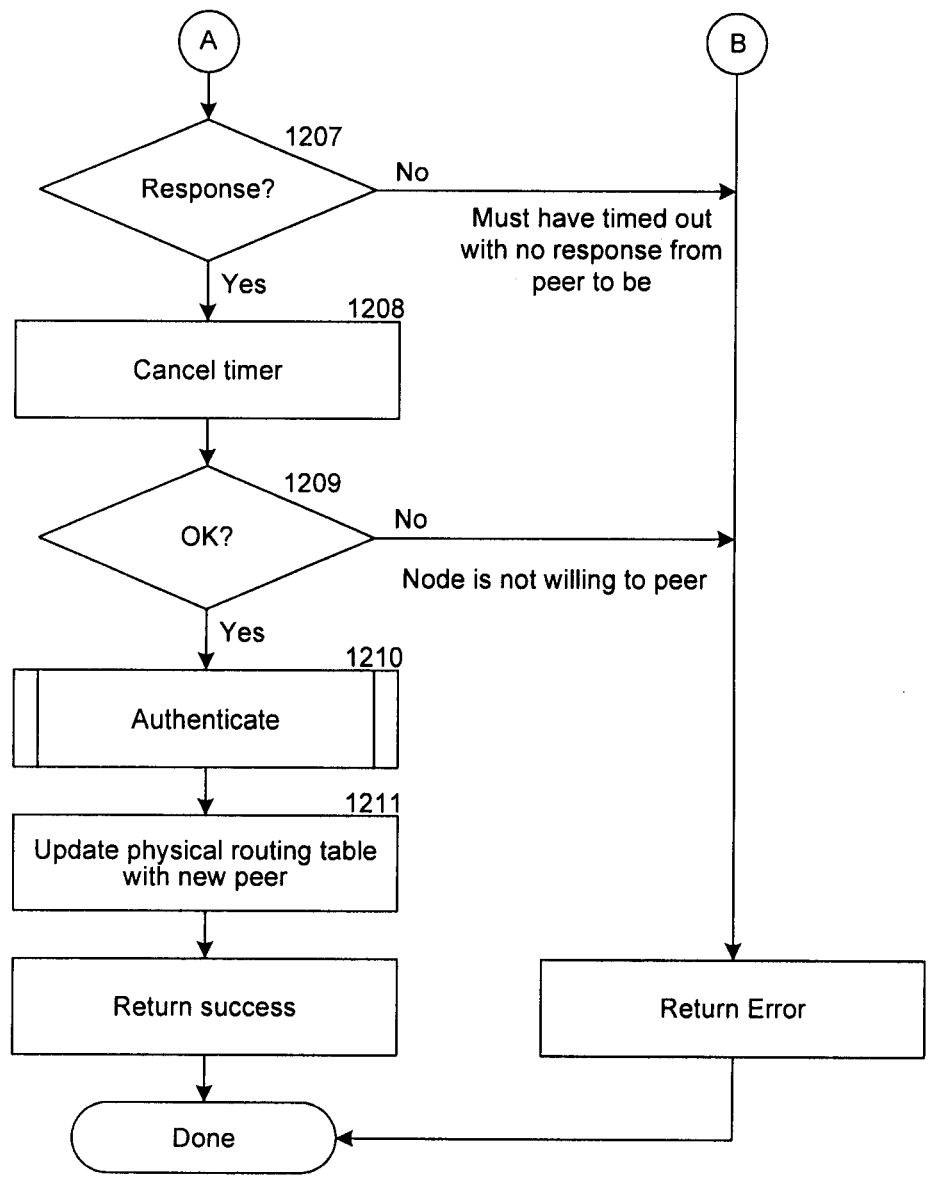

FIG. 12 is a flow diagram illustrating the processing of the establish peer connection function in one embodiment. This function is passed the identifier of the destination node. The function establishes a connection with the destination node and updates the physical routing table. In block 1201, the function looks up the destination node identifier in the peer table. In decision block 1202, if the network address of the destination node is in the peer table, then the function continues at block 1203, else a connection cannot be established and the function returns an indication of error. In block 1203, the function creates a peer connect request message that identifies this node. In block 1204, the function sends the peer connect request message to the network address for the destination node. To send the message, the function establishes a transport level connection to the network address and then sends the message. If a connection cannot be established, then the function returns an indication of error. In block 1205, the function sets a timer. In block 1206, the function waits for a response from the destination node or a timeout. In decision block 1207, if a response is received from the destination node, then the function continues at block 1208, else a timeout occurred and the function returns an indication of error. In block 1208, the function cancels the timer. In decision block 1209, if the response indicates that a connection can be established, then the function continues at block 1210, else the destination node is not willing to connect to this node and the function returns an indication of error. In block 1210, the function authenticates the destination node. Various well-known authentication techniques can be used, such as use of public/private key pairs in which the destination node sends a message encrypted with its private key and this node decrypts the message using the public key. If the destination node cannot be authenticated, then the function returns an indication of error. In block 1211, the function updates the physical routing table to indicate that the destination node is accessible as a peer node (i.e., connected at the physical routing layer) and then returns an indication of success.

Figure 13A:
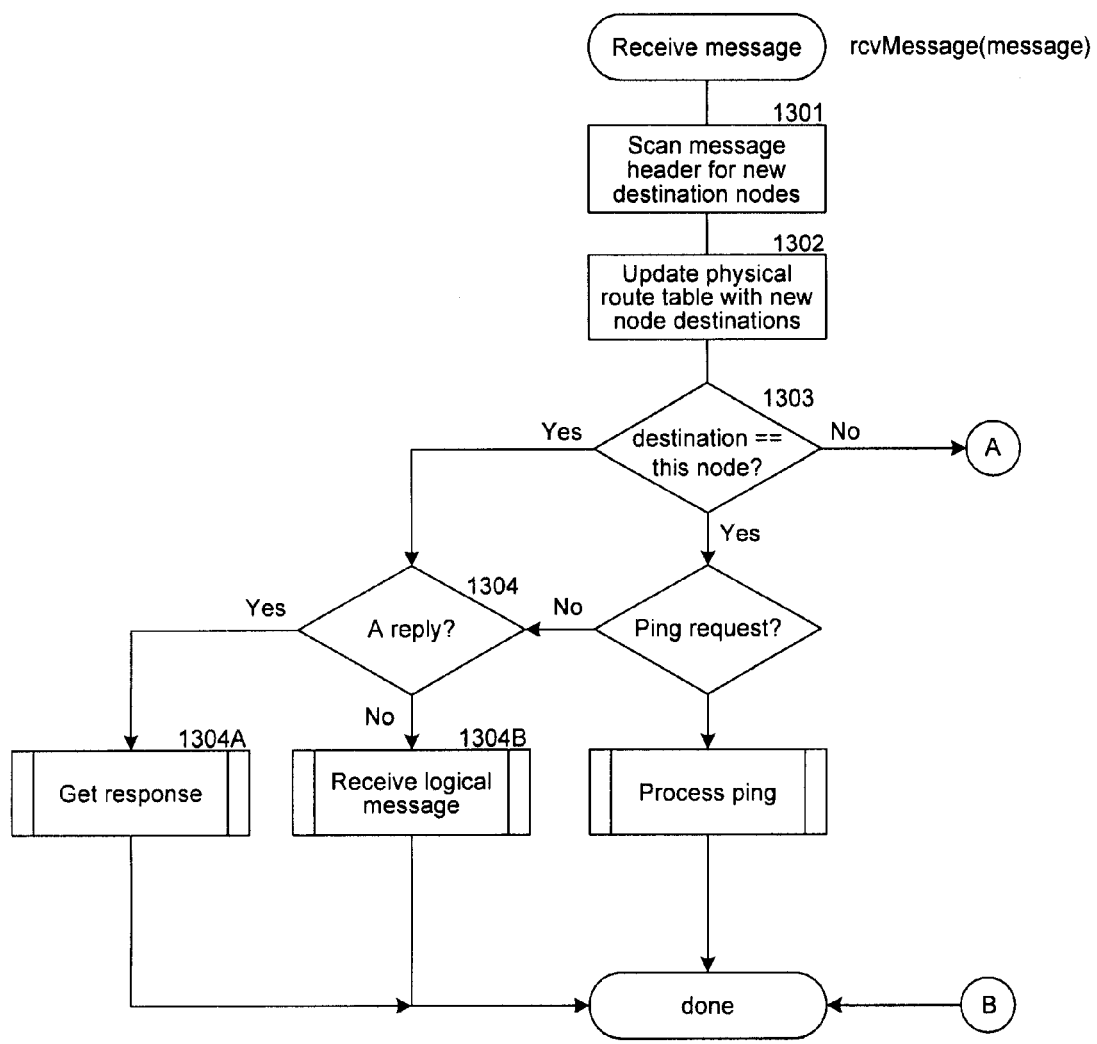
FIG. 13 is a flow diagram illustrating the processing of the receive message function of the physical routing layer in one embodiment.
Figure 13B:
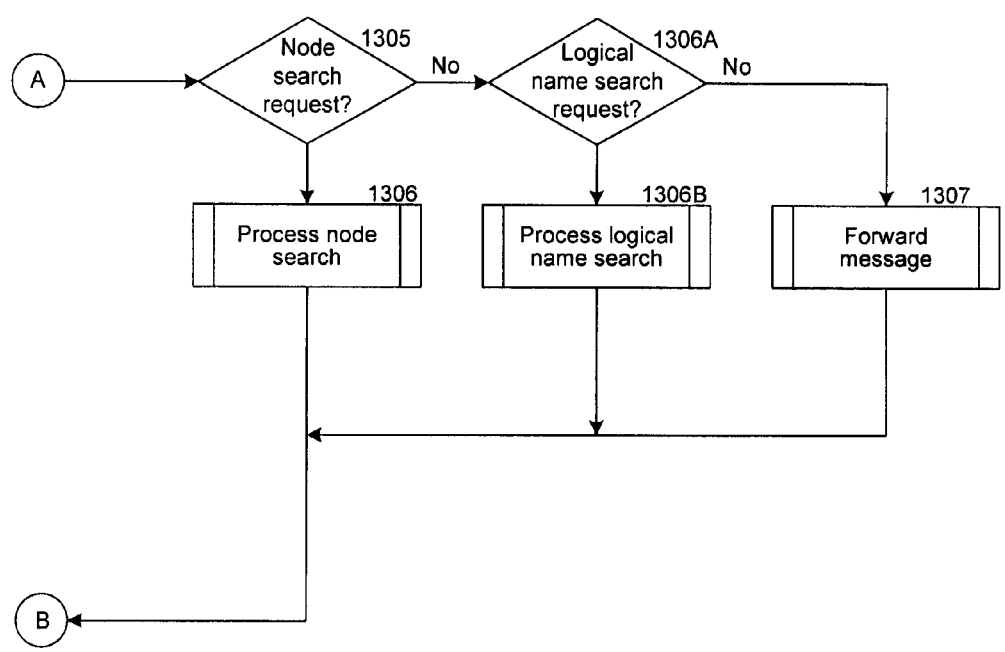
Figure 14:
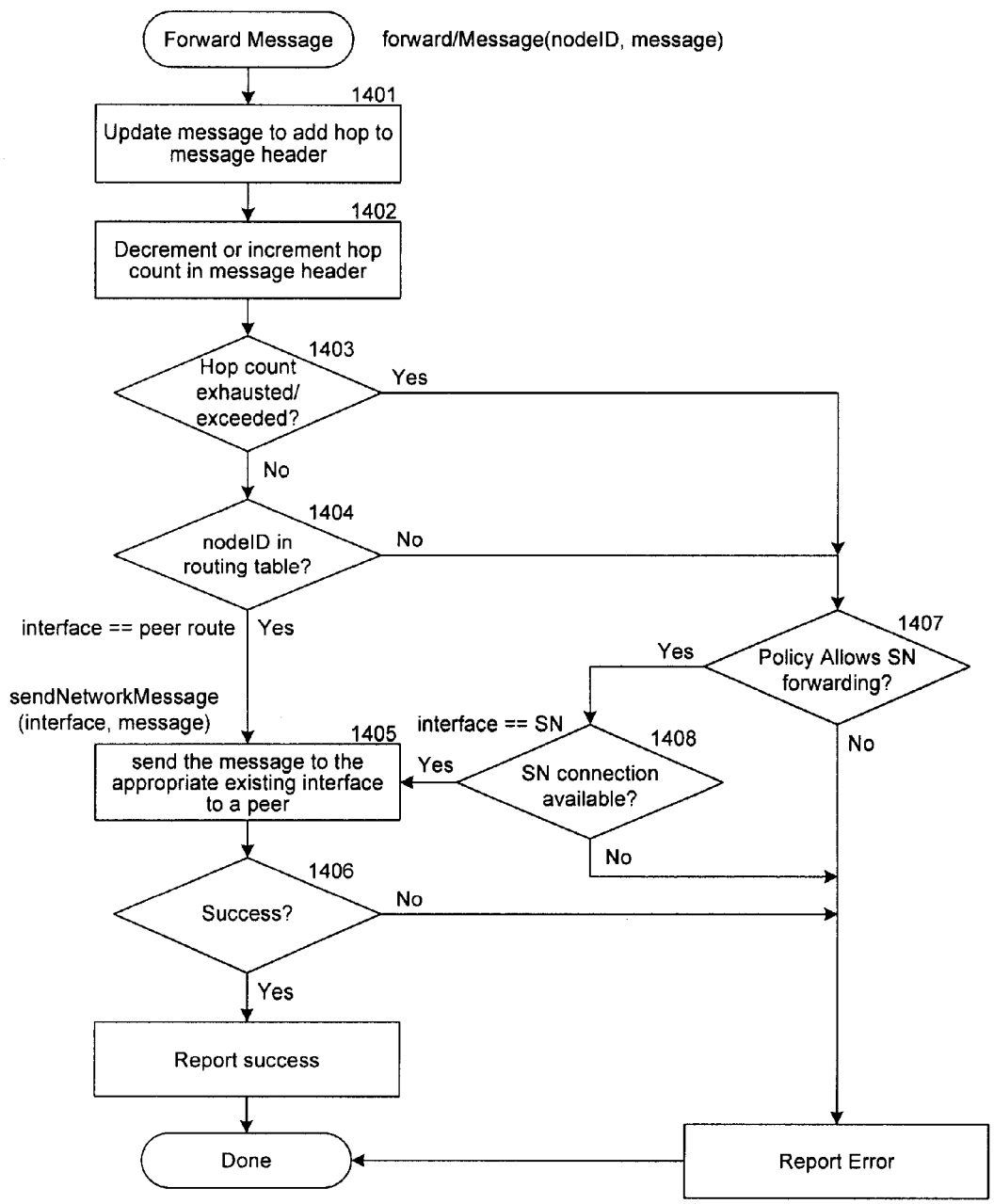
FIG. 14 is a flow diagram illustrating the processing of the forward message function of the physical routing layer in one embodiment.
Figure 15:
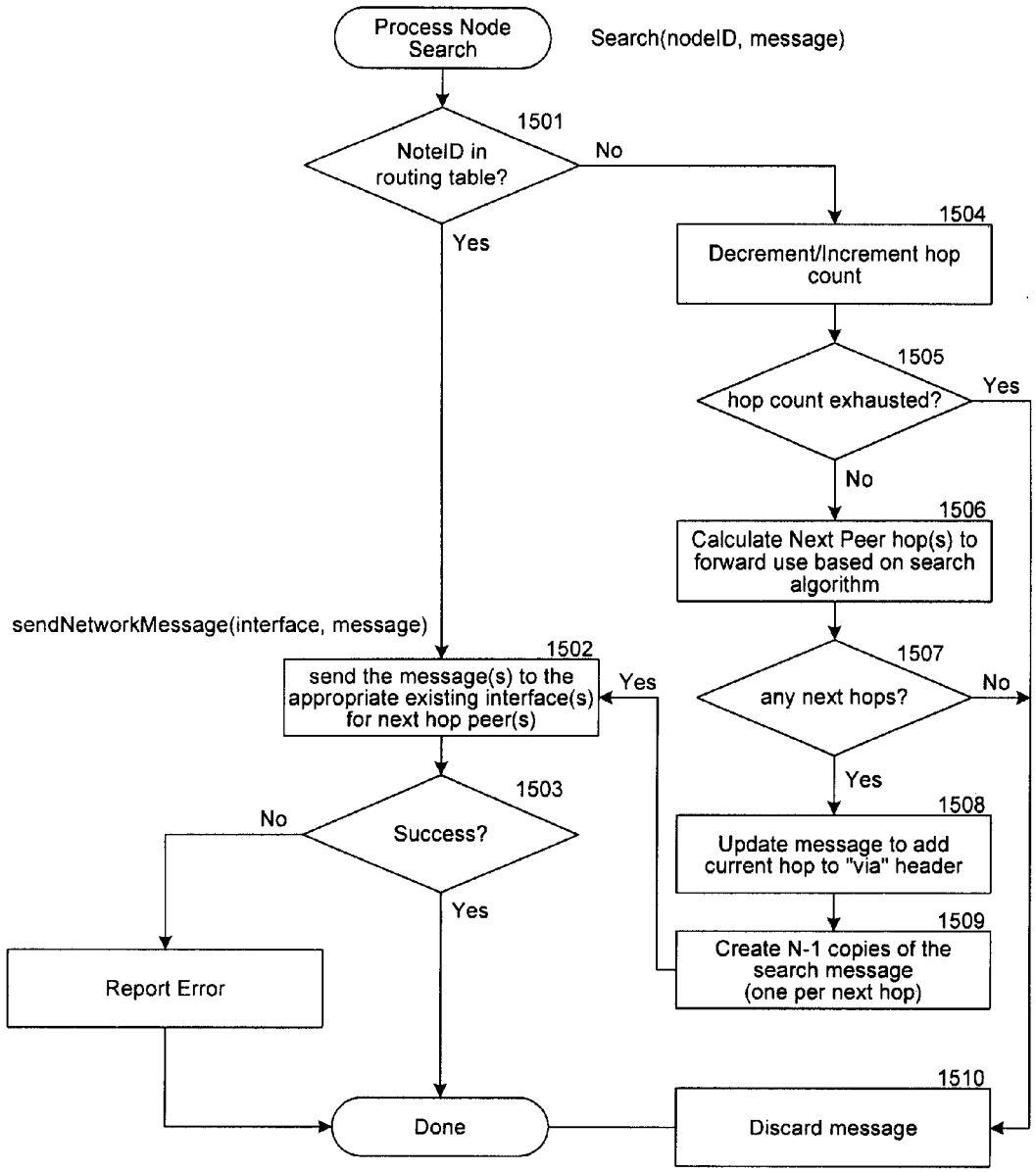
FIG. 15 is a flow diagram illustrating the processing of the process node search function in one embodiment.

FIGS. 13-15 are flow diagrams illustrating the processing of a received message of the physical routing layer. FIG. 13 is a flow diagram illustrating the processing of the receive message function of the physical routing layer in one embodiment. The function is passed a message that has been received from a peer node. The function determines whether the message is intended for this node or another node. If the message is intended for this node, then the function forwards the message to the logical routing layer. In block 1301, the function scans the message header for a new destination node. The message header identifies the destination node and each node in the path from the originating node to this node. In block 1302, the function updates the physical routing table to add any of the nodes identified in the message header that are not already in the physical routing table. The updates indicate that the identified nodes are accessible through the peer node that sent the message. In decision block 1303, if the destination node is this node, then the function continues at block 1304, else the function continues at block 1305. In decision block 1304, if the message is a response to a message previously sent, then the function continues at block 1304A, else the function continues at block 1304B. In block 1304A, the function notifies the logical routing layer that a response has been received by invoking the get response function of the logical routing layer and then returns. In block 1304B, the function invokes the receive logical message function of the logical routing layer passing the received message to pass the message to the logical routing layer and then returns. In decision block 1305, if the message is a node search request, then the function continues at block 1306, else the function continues at block 1306A. In block 1306, the function invokes the process node search function passing the identifier of the destination node and the message and then returns. The invoked function checks the physical routing table of this node to determine whether the destination node is accessible through this node. If not, it sends the search request to its peer nodes. In decision block 1306A, if the message is a logical name search request, then the function continues at block 1306A, else the function continues at block 1307. In block 1306B, the function invokes the process logical name search function of the logical routing layer. In block 1307, the function invokes the forward message function to forward the message onto the next route (i.e., a peer node of this node) in the path to the destination node and then returns.

FIG. 14 is a flow diagram illustrating the processing of the forward message function of the physical routing layer in one embodiment. The function is passed a destination node identifier and a message to be forwarded. This function sends the message to a peer node that is in the path to the destination node. In block 1401, the function updates the message to add the information about this node into the message header. In block 1402, the function decrements the hop count in the message header. Each hop corresponds to a node along the path to the destination node. The hop count indicates the maximum number of hops that a message can travel on its way to the destination node. The node that originates the message can set the hop count. Alternatively, the message header may contain an indication of the number of hops that the message has traveled. Each node can decide, based on that number, whether to continue forwarding the message. In decision block 1403, if the hop count is zero, then the function continues at block 1407, else the function continues at block 1404. In decision block 1404, if the destination node identifier is in the physical routing table, then the destination node is accessible through this node and the function continues at block 1405, else the function continues at block 1407. In block 1405, the function sends the message to a peer node through which the destination node is accessible. In decision block 1406, if sending the message was successful, then the function reports an indication of success and returns, else the function reports an indication of error and returns. In decision block 1407, if the policy of this node allows for forwarding to the server node, then the function continues at block 1408, else the function reports an indication of error and returns. In decision block 1408, if a server node connection is available, then the function continues at block 1408 to forward the message to the server node, else the function reports an indication of error and returns. The server node can then forward the message to the destination node now if it is online or later when the destination node comes online.

FIG. 15 is a flow diagram illustrating the processing of the process node search function in one embodiment. The function is passed a destination node identifier and a message. The function forwards the message to the next node in the path to the destination node. If this node has already processed this message when the message was received from a different peer node, then the function may return without further processing. In decision block 1501, if the destination node identifier is in the physical routing table, then the destination node is accessible through this node and the function continues at block 1502, else the function continues at block 1504. In block 1502, the function sends the message to the next peer node in the path as indicated in the physical routing table. If the destination node is accessible through more than one peer node, then the function sends a message to each of those peer nodes. In decision block 1503, if sending the message to at least one peer node was successful, then the function returns, else the function reports an indication of error and returns. In blocks 1504-1509, the function forwards the search message to the peer nodes of this node. In block 1504, the function decrements the hop count. In decision block 1505, if the hop count is equal to zero, then the function discards the message and returns, else the function continues at block 1506. In block 1506, the function identifies the next peer node to forward the search message based on a search algorithm. The search algorithm described here is one that exhaustively searches all peer nodes to locate a destination node. Alternative search algorithms may select a single peer node for search message forwarding. One skilled in the art will appreciate that the search algorithms may be optimized to best suit node topologies, hop counts, geographic location, and application requirements. In decision block 1507, if a next peer node was identified, then the function continues at block 1508, else the function continues at block 1510. In block 1508, the function updates the message to add the information relating to this node to the message header. In block 1509, the function creates a copy of the message for each peer node to which the message is to be sent and continues at block 1502 to send the message to each identified peer node. In block 1510, the function discards the message and returns.

Figure 16:
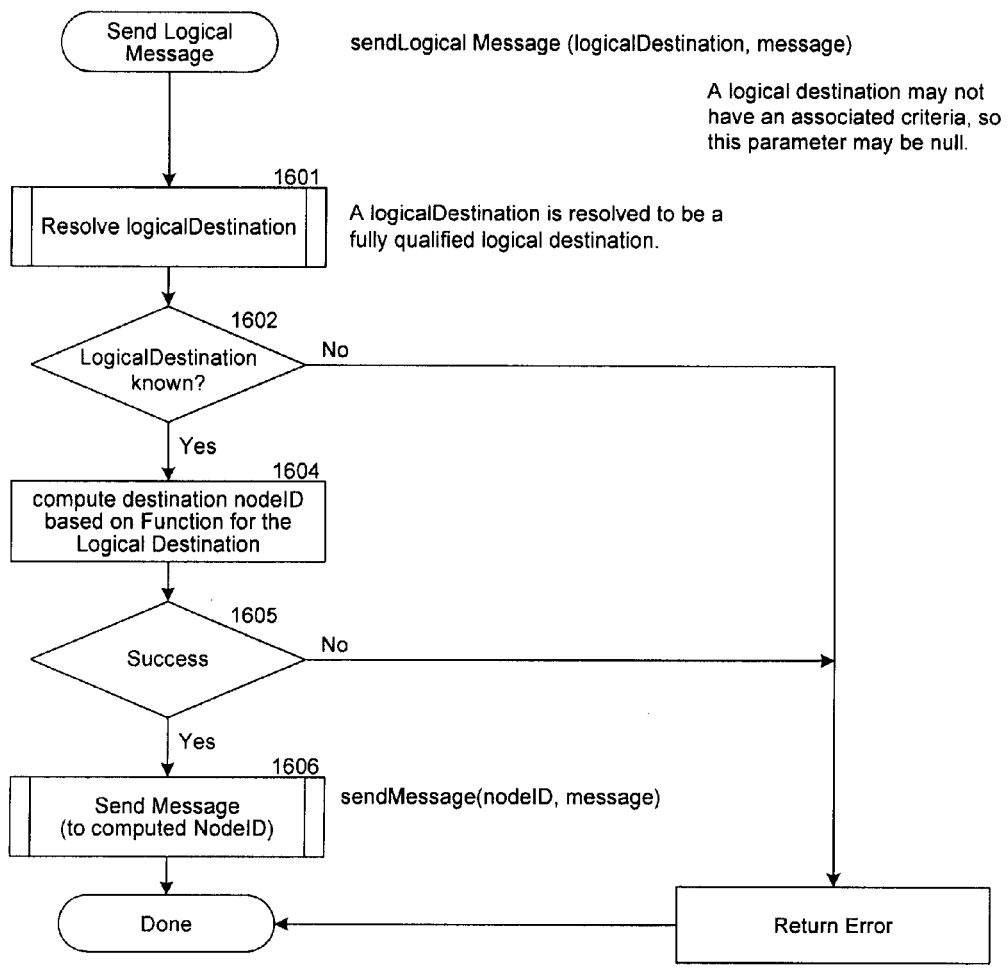
FIG. 16 is a flow diagram illustrating the processing of the send logical message function of the logical routing layer in one embodiment.

FIGS. 16-25 are flow diagrams illustrating the processing of the logical routing layer in one embodiment. FIGS. 16-21 are flow diagrams, illustrating the processing of a send message of the logical routing layer FIG. 16 is a flow diagram illustrating the processing of the send logical message function of the logical routing layer in one embodiment. The send logical message function is passed a logical destination and a message. The logical destination indicates where the message is to be sent. For example, the logical destination may be identified by a user name, a logical name (e.g., "address book") or a fully qualified logical name (e.g., "addressbook.node.opendesign.com"). The function determines the identifier of the destination node corresponding to that logical destination and sends the message to that node by invoking the send message function of the physical routing layer. In block 1601, the function invokes the resolve logical destination function. The invoked function updates the logical routing table to add an entry for the logical destination if such an entry is not already in the table. In decision block 1602, if the logical destination was successfully resolved, then the function retrieves the entry from the logical routing table and continues at block 1604, else the function returns an indication of error. In block 1604, the function computes the destination node identifier by invoking the node identification function of the retrieved entry passing the message. In decision block 1605, if the destination node identifier was successfully computed, then the function continues at block 1606, else the function returns an indication of error. In block 1606, the function invokes the send message function of the physical routing layer to send the message to the destination node and then returns the indication of success or error that is returned by the invoked send message function. In one embodiment, the node identification function may use a criteria, a key function and a routing table. The key function is invoked passing the criteria to generate a key. The key is then used to search the routing table to identify the node identifier. For example, the criteria for the address book application may be the last name, and the key function may return the first letter of the last name. The routing table may be a tree that maps letters to node identifiers.

Figure 17A:
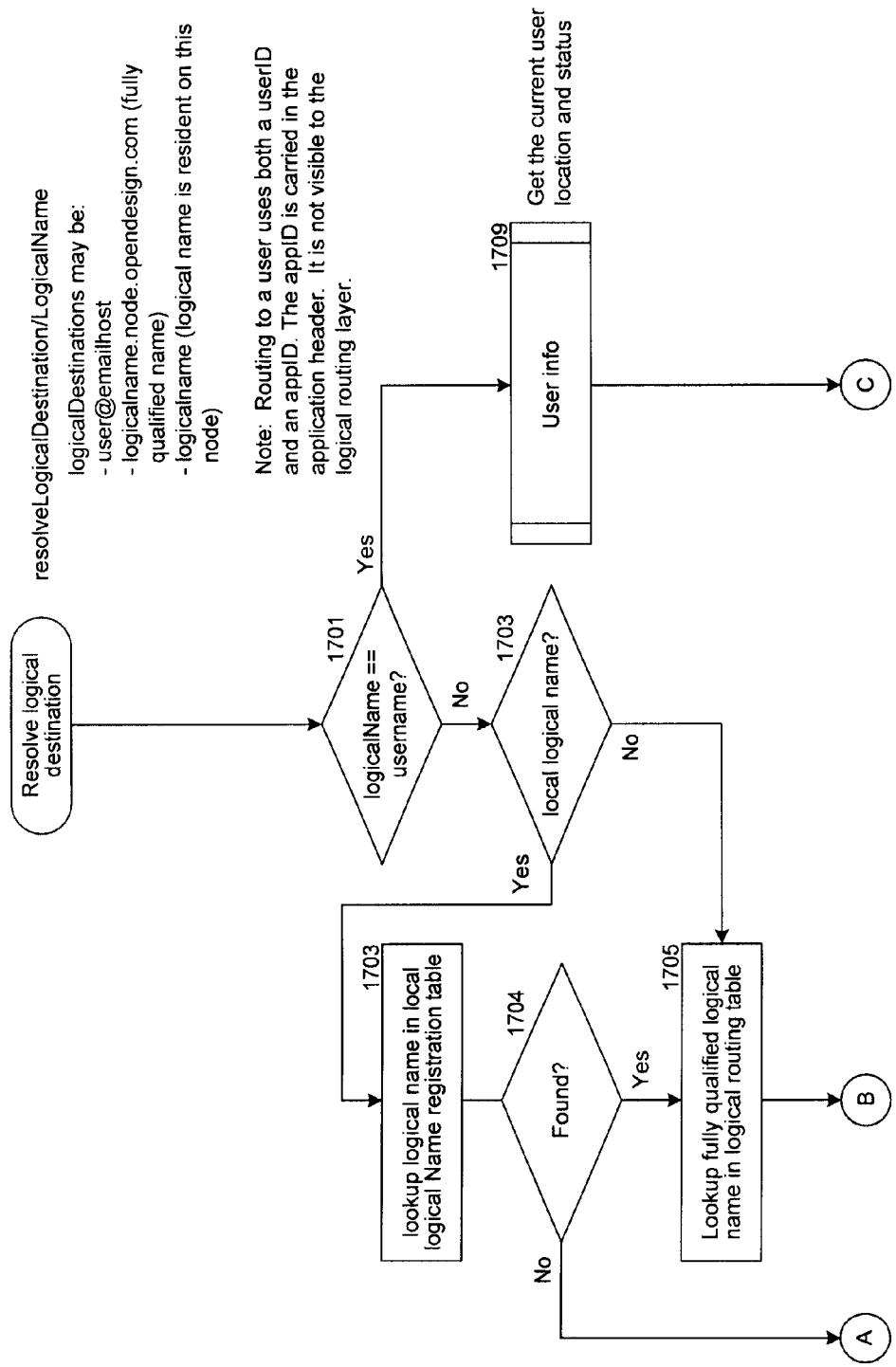
FIG. 17 is a flow diagram illustrating the processing of the resolve logical destination function of the logical routing layer in one embodiment.
Figure 17B:
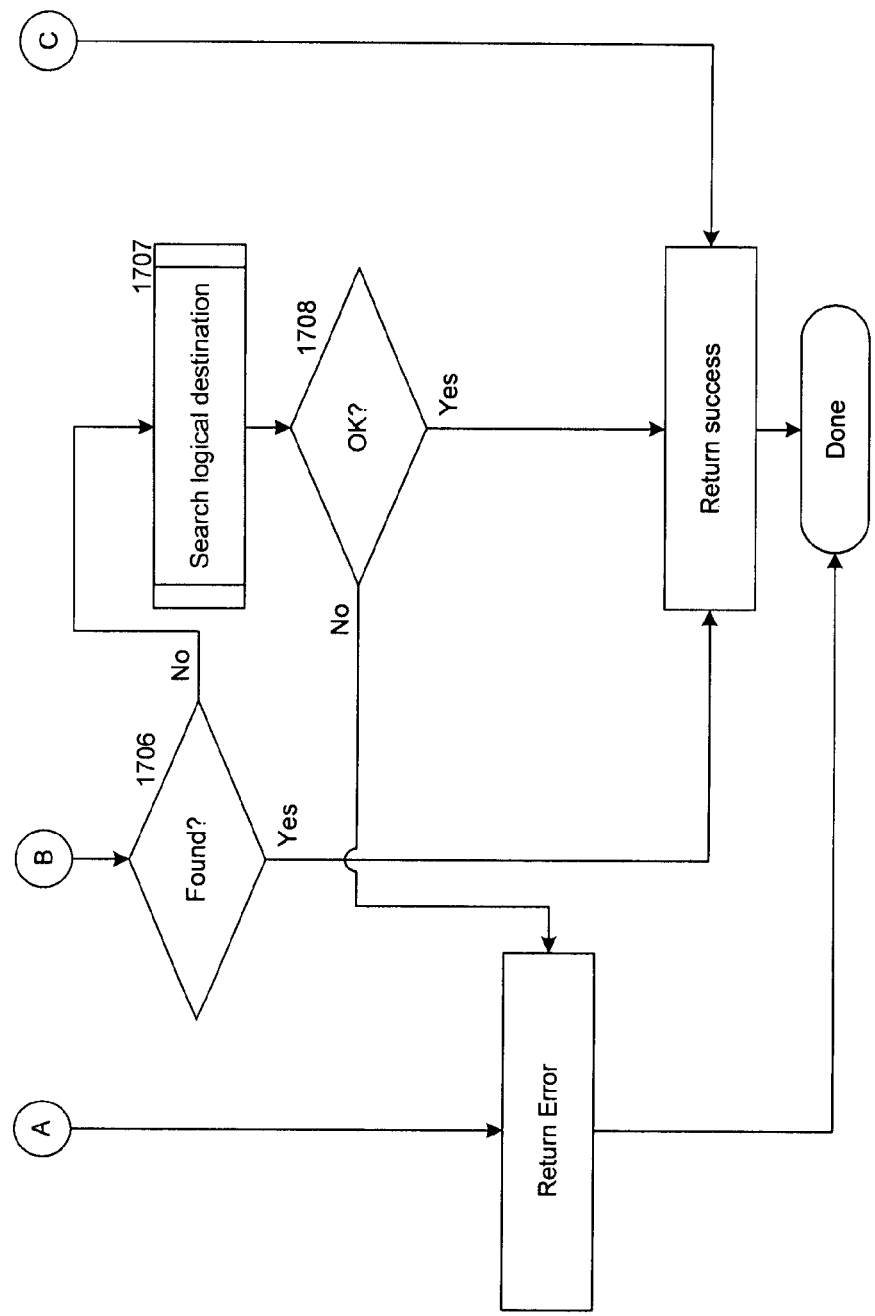

FIG. 17 is a flow diagram illustrating the processing of the resolve logical destination function of the logical routing layer in one embodiment. This function is passed an indication of a logical destination and returns a fully qualified logical name. In decision block 1701, if the logical destination is a user name, then the function continues at block 1710, else the function continues at block 1702. In decision block 1702, if the logical name of the logical destination is local to this node then the function continues at block 1703, else the function continues at block 1705. In block 1703, the function retrieves the entry for the logical name from the logical routing table. The entry includes the fully qualified logical name. In decision block 1704, if an entry for the logical name is found, then the function continues at block 1705, else the function returns an indication of error. In block 1705, the function retrieves an entry for the fully qualified logical name from the logical routing table. In decision block 1706, if the entry for the fully qualified logical name was retrieved, then the function sets the logical destination to the fully qualified logical name and returns an indication of success, else the function continues at block 1707. In block 1707, the function invokes the search logical destination function to search for the logical destination globally. The invoked function may search at a server node or through peer nodes to find the fully qualified logical name. In decision block 1708, if a fully qualified logical name was found while searching, then the function returns an indication of success, else the function returns an indication of error. In block 1709, the function invokes the user information function to find the user identifier for the user name. The invoked function may add an entry to the logical routing table to map the user identifier to the node identifier. The function then returns an indication of success.

Figure 18A:
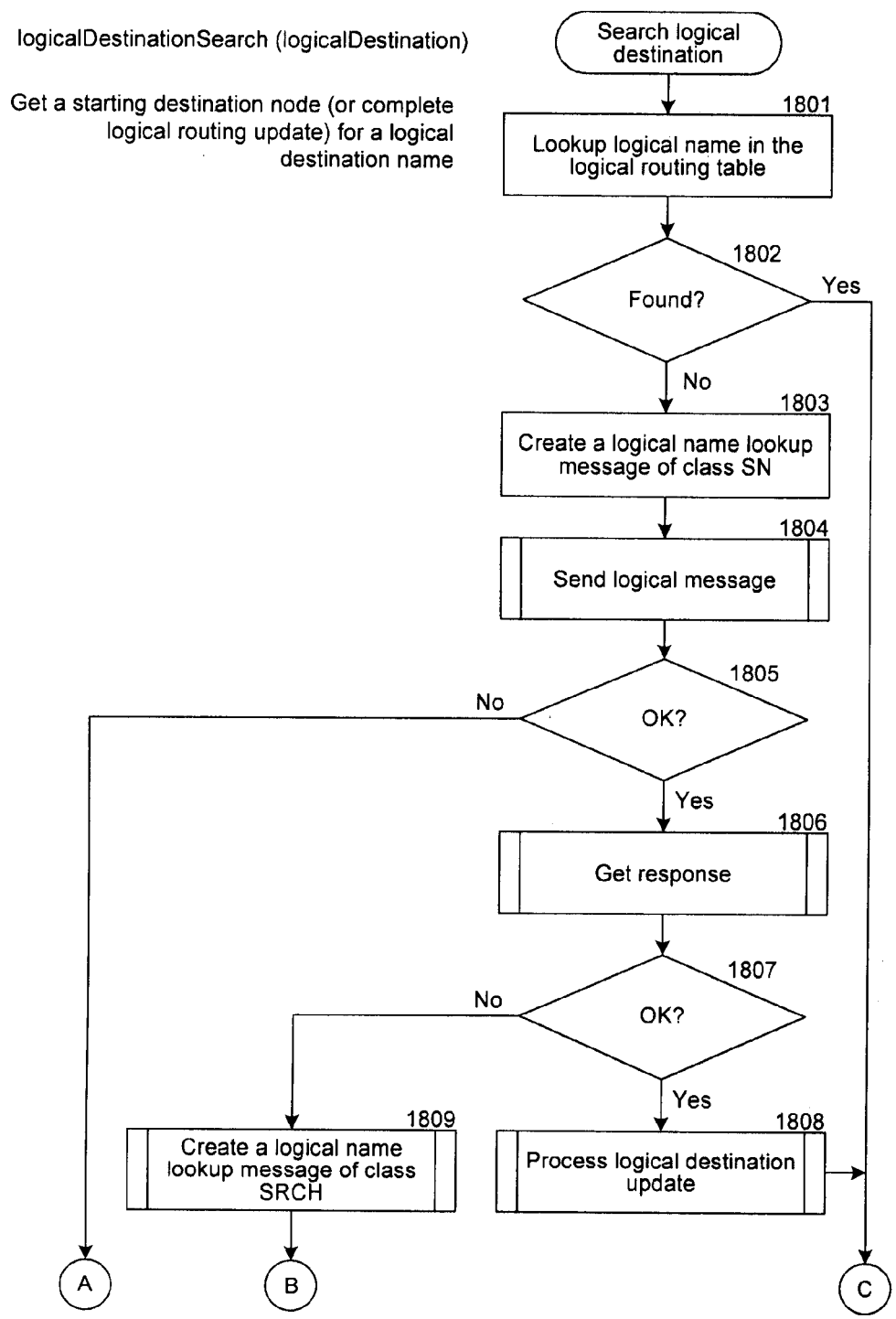
FIG. 18 is a flow diagram illustrating the processing of the search logical destination function of the logical routing layer in one embodiment.
Figure 18B:
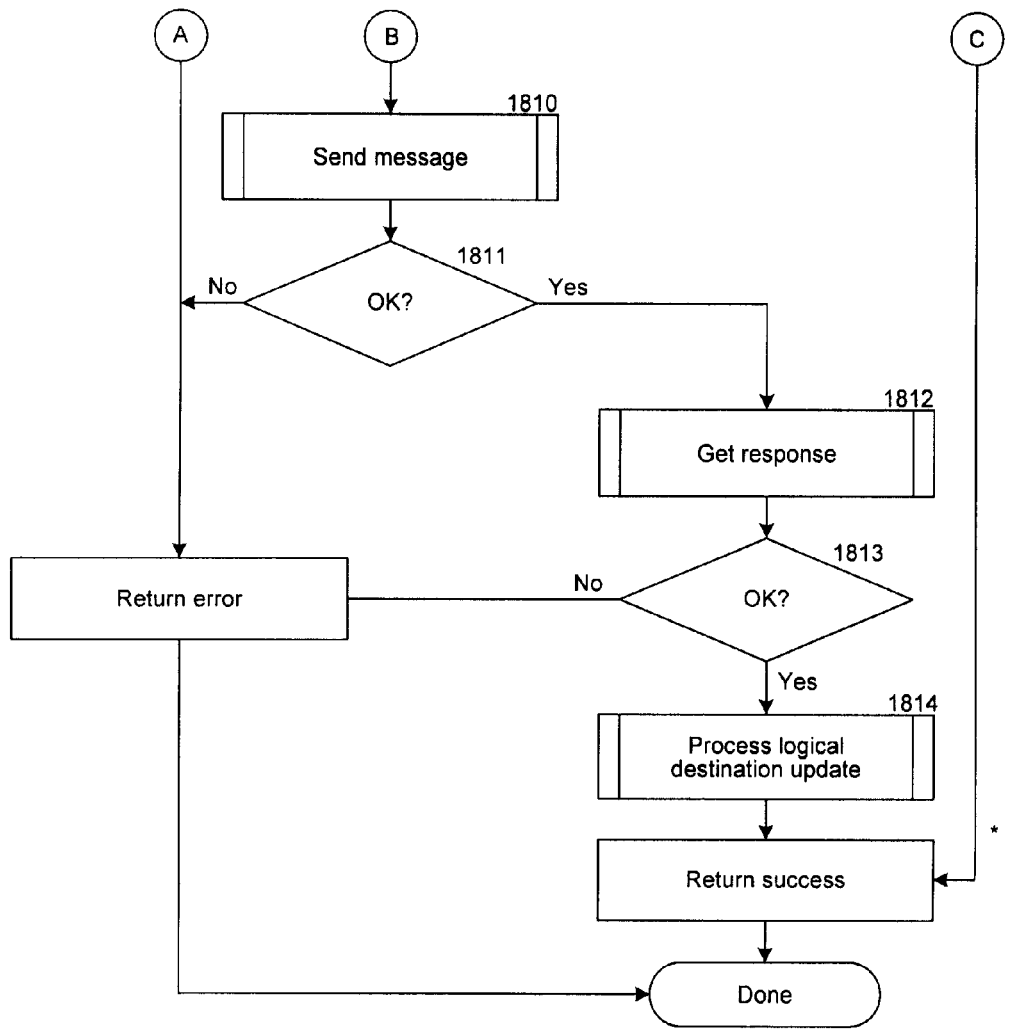

FIG. 18 is a flow diagram illustrating the processing of the search logical destination function of the logical routing layer in one embodiment. This function is passed a logical destination that is a fully qualified logical name and adds an entry to the logical routing table (if not already added) to map the fully qualified logical name to a node identifier. In one embodiment, the node identifier can be extracted from the fully qualified name. In another embodiment, the node identifier is retrieved by sending a message to a logical destination of the logical routing map. In this described embodiment, however, the node identifier is either retrieved from a server node or by searching peer nodes. This function sends a message to a server node that stores global logical destination information. If the information for the entry is not received from the server node, then the function sends a search message to its peer nodes, which it propagated throughout the network. In block 1801, the function looks up the passed logical destination in the logical routing table. In decision block 1802, if an entry for the logical destination was found, then the function returns an indication of success, else the function continues at block 1803. In block 1803, the function creates a logical name lookup message of class SN. The message indicates that the sending node is requesting information for mapping the logical name to a node identifier. In block 1804, the function invokes the send logical message function passing the created message and the node identifier logical destination of the server node. In decision block 1805, if the message was sent successfully, then the function continues at block 1806, else the function returns an indication of error. In block 1806, the function invokes the get response function to wait for a response to be received. In decision block 1807, if a response was received, then the function continues at block 1808, else the function continues at block 1809. In block 1808, the function invokes the process logical destination update function to update the logical routing table and then returns an indication of success. In block 1809, the function creates a logical name lookup message of class SEARCH. The SEARCH class indicates that message is sent from a peer node to search for a node identifier. In block 1810, the function invokes the send message function of the physical routing layer to send the created message. The search message is sent to peer nodes that respond when the logical destination can be accessed through them. In decision block 1811, if the send message indication was successful, then the function continues at block 1812, else the function returns an indication of error. In block 1812, the function invokes the get response function to wait for a message or a timeout. In decision block 1813, if a response was received, then the function continues at block 1814, else the function returns an indication of error. In decision block 1814, the function invokes the process logical destination update function to update the logical routing table and then returns an indication of success.

Figure 19:
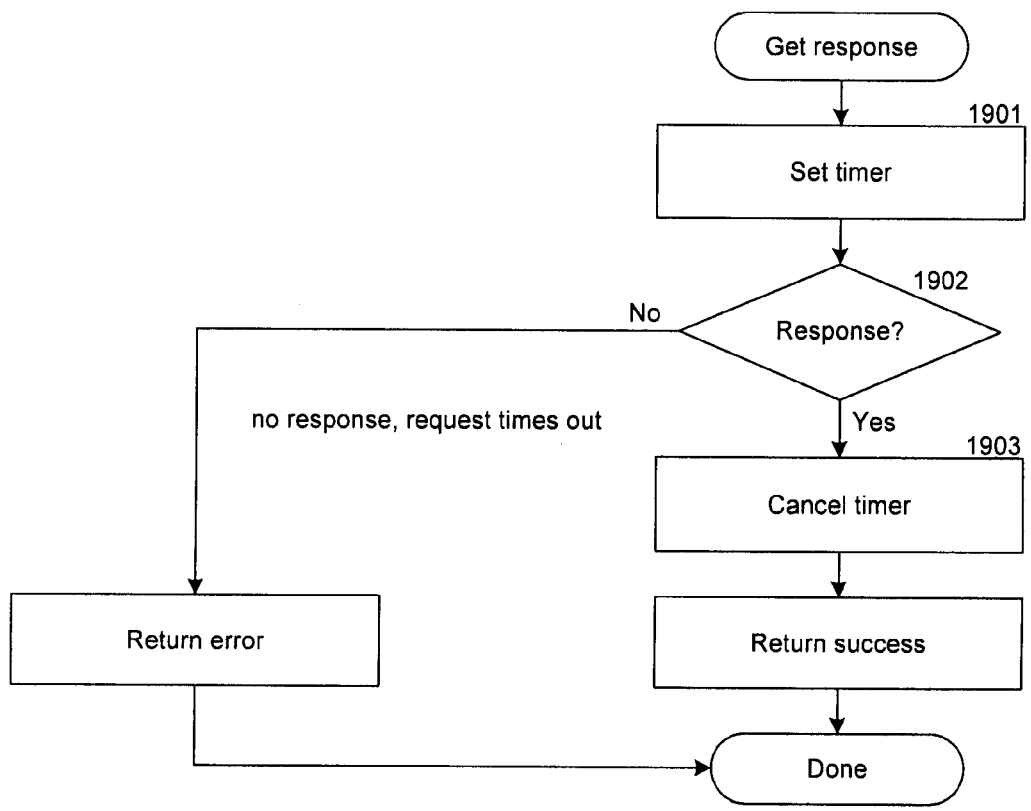
FIG. 19 is a flow diagram illustrating the processing of the get response function of the logical routing layer in one embodiment.

FIG. 19 is a flow diagram illustrating the processing of the get response function of the logical routing layer in one embodiment. This function is a low-level function that is used to set a timer and wait for either a response to a message or a time out. In block 1901, the function sets a timer. In decision block 1902, if a response was received, then the function continues at block 1903, else a timeout occurred and the function returns an indication of error. In block 1903, the function cancels the timer and returns an indication of success.

FIG. 20 is a flow diagram illustrating the processing of the process logical destination update function of the logical routing layer in one embodiment. This function is passed information for a logical destination and updates an existing entry in, or adds a new entry to, the logical routing table for that logical destination. In block 2001, the function looks up the passed logical destination in the logical routing table. In decision block 2002, if the logical destination was found, then the function continues at block 2004, else the function continues at block 2003. In block 2003, the function adds a new entry for the logical destination to the logical routing table. In block 2004, the function updates the entry in the logical routing table with the class and node identification function. The function then returns an indication of success.

Figure 21A:
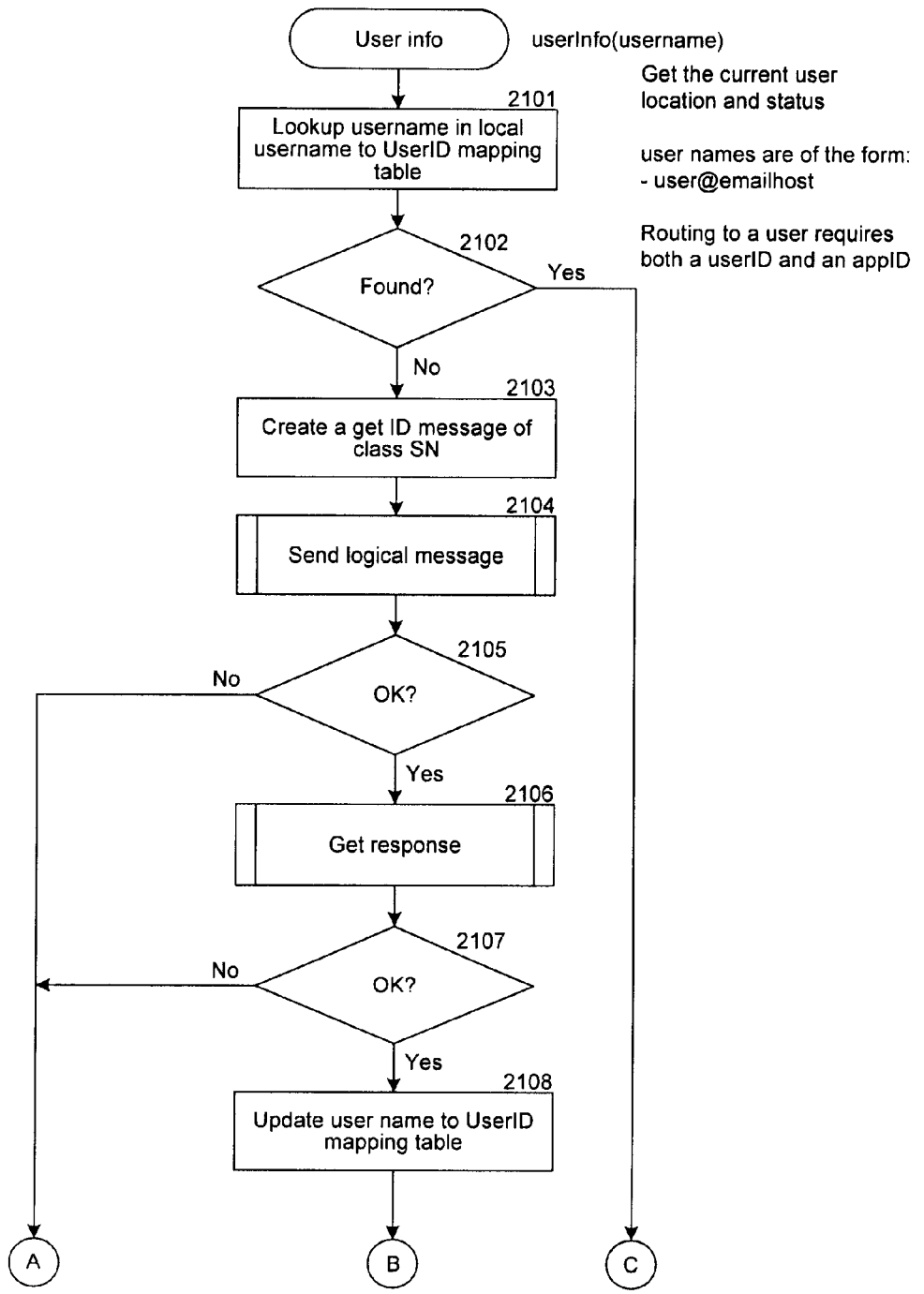
FIG. 21 is a flow diagram illustrating the processing of the user information function of the logical routing layer in one embodiment.
Figure 21B:
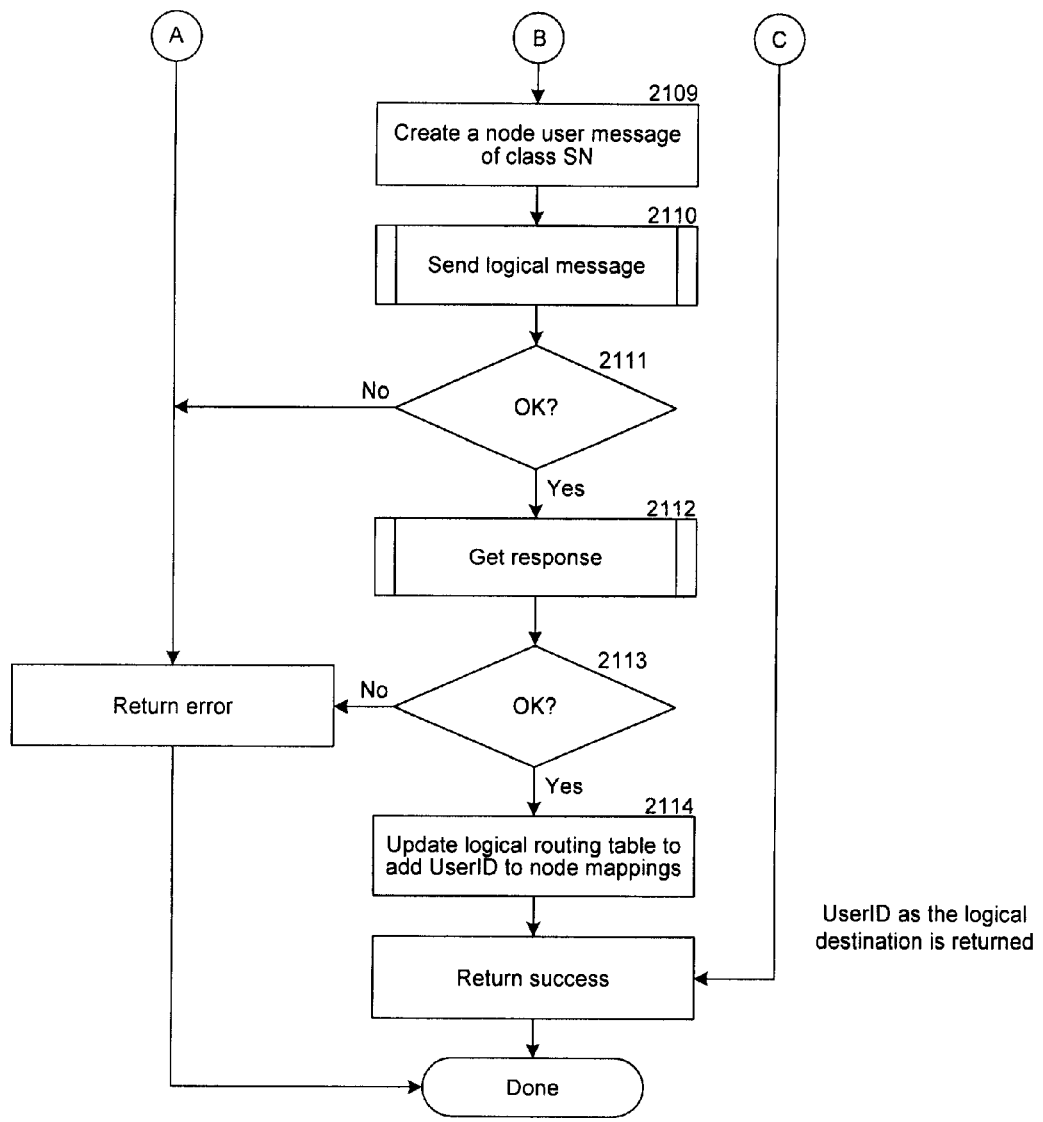

FIG. 21 is a flow diagram illustrating the processing of the user information function of the logical routing layer in one embodiment. This function is passed a user name, updates the logical routing table as appropriate to map the user identifier for the user name to a node identifier and returns the user identifier as the logical destination. In block 2101, the function looks up the user name in the logical routing table. In decision block 2102, if the lookup was successful, then the function returns the user identifier as the logical destination along with an indication of success, else the function continues at block 2103. In block 2103, the function creates a get user identifier message of class SN. The message is a request to retrieve a user identifier associated with a user name. In block 2104, the function invokes the send logical message function to send the created message to a logical destination that maps user names to user identifiers. In decision block 2105, if the message was successfully sent, then the function continues at block 2106, else the function returns an indication of error. In block 2106, the function invokes the get response function. In decision block 2107, if a response was successfully received, then the function continues at block 2108, else the function returns an indication of error. In block 2108, the function adds an entry to the logical routing table that maps the user name to the user identifier provided in the response by the server node. In block 2109, the function creates a node user message of class SN. In block 2110, the function invokes the send logical message function to send the created message to the logical destination of the logical routing map to find out the node(s) of the user identifier. In block 2111, if the message was successfully sent, then the function continues at block 2112, else the function returns an indication of error. In block 2112, the function invokes the get response function. In decision block 2113, if a response was successfully received, then the function continues at block 2114, else the function returns an indication of error. In block 2114, the function updates the logical routing table to add an entry for the user identifier and node identifier provided in the response and then returns the user identifier as the logical destination along with an indication of success.

Figure 22:
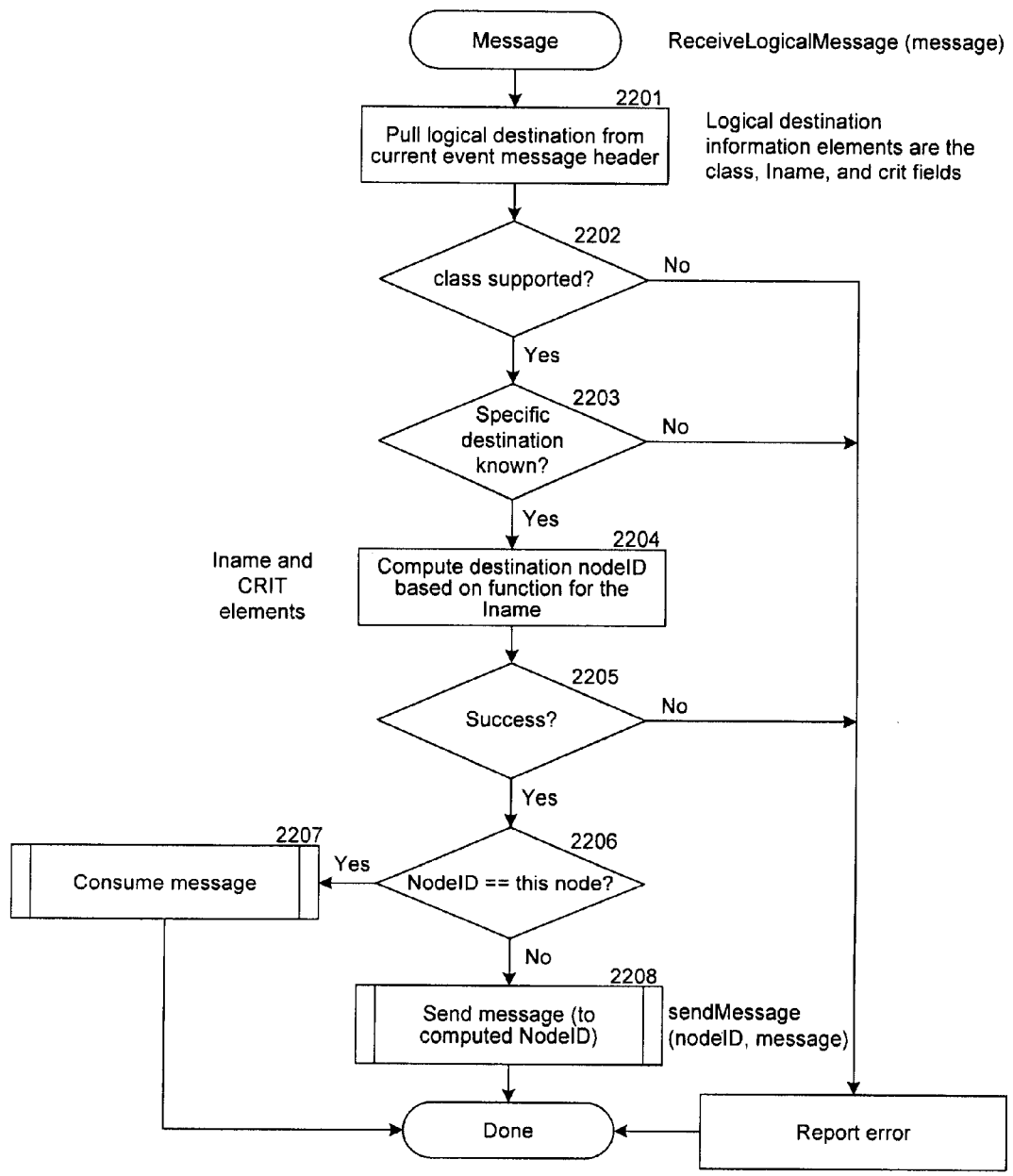
FIG. 22 is a flow diagram illustrating the processing of the receive logical message function of the logical routing layer in one embodiment.

FIG. 22 is a flow diagram illustrating the processing of the receive logical message function of the logical routing layer in one embodiment. This function is passed the received message. If the logical function and specified instance of the message are known to this node, then the function computes the node identifier. If the identified node is this node, then the function passes the message to the application for processing. Otherwise, the function sends the message to the identified node. In block 2201, the function retrieves the logical destination from the message header along with the function and instance specified in the message header. In one embodiment, the message header includes a logical destination ("lname"), a class ("class"), and a criteria ("crit"). In decision block 2202, if the class is supported by this node as indicated by the logical routing table, then the function continues at block 2203, else the function reports an indication of error and returns. In decision block 2203, if the logical destination is known to this node as indicated by the logical routing table, then the function continues at block 2204, else the function reports an indication of error and returns. In block 2204, the function computes the destination node identifier based on the node identification function for the logical destination and the criteria. In decision block 2205, if the destination node identifier was successfully computed, then the function continues at block 2206, else the function reports an indication of error and returns. In decision block 2206, if the computed node identifier identifies this node, then the function continues at block 2207, else the function continues at block 2208. In block 2207, the function consumes the message and returns. In block 2208, the function invokes the send message function of the physical routing layer to send the message to the computed node identifier and then returns.

Figure 23:
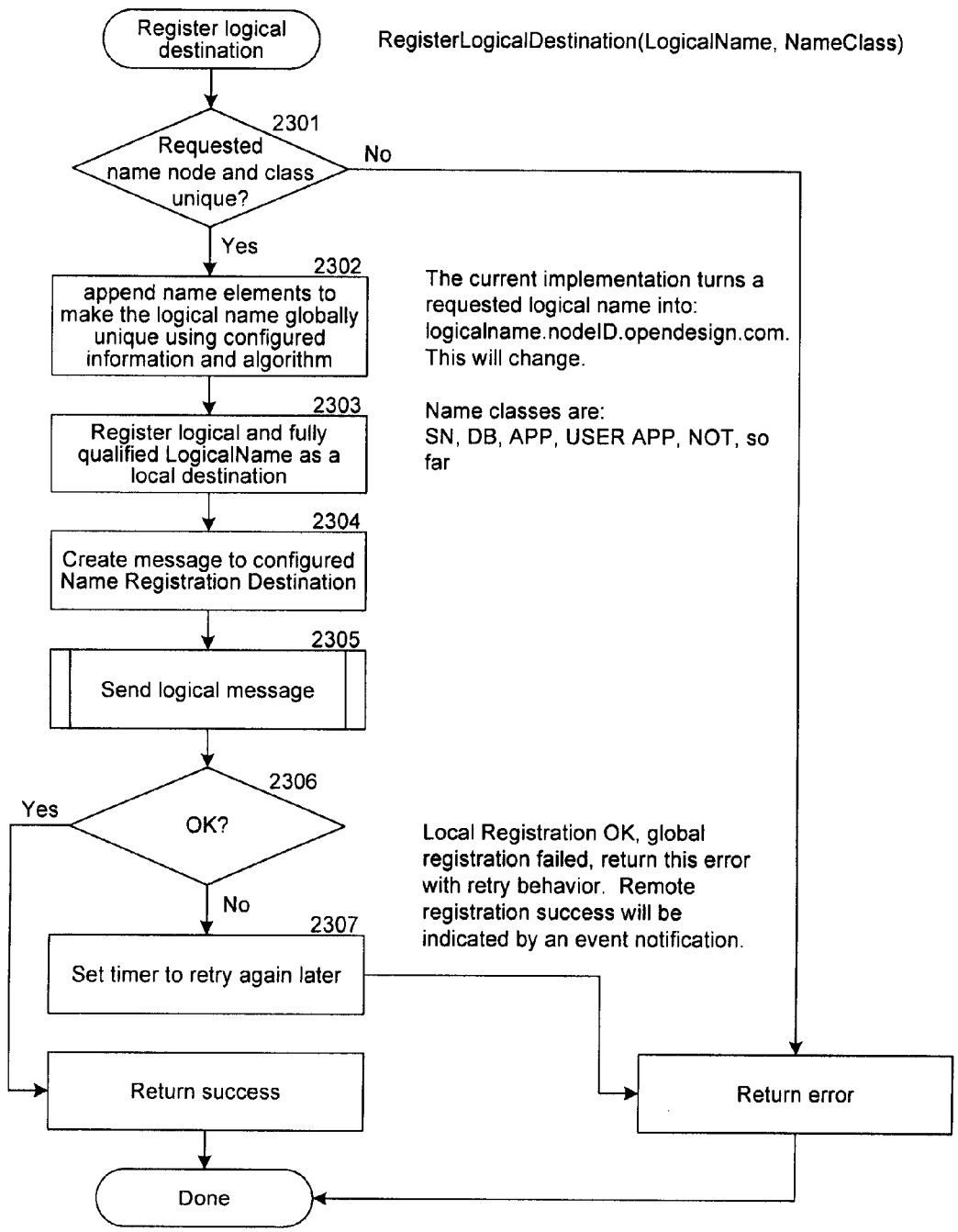
FIG. 23 is a flow diagram illustrating the processing of the register logical name function of the logical routing layer in one embodiment.

FIG. 23 is a flow diagram illustrating the processing of the register logical name function of the logical routing layer in one embodiment. This function is invoked by application programs to register their logical name both locally and globally. This function is passed the logical name and name class. In decision block 2301, if the combination of logical name and class is not in the logical routing table, then the function continues at block 2302, else the function returns an indication of error. In block 2302, the function creates a fully qualified logical name from the passed logical name. For example, the function may append the identifier of this node along with a registered domain name to the logical name to generate the fully qualified logical name (e.g., "logicalname" to "logicalname.nodeID.company.com"). In block 2303, the function adds an entry to the logical routing table for the logical name. This entry includes the node identification function. In block 2304, the function creates a message to register the logical name globally. In block 2305, the function invokes the send logical message function of the logical routing layer to send the registration message for registration with the logical routing map. In decision block 2306, if the message was sent successfully, then the function returns an indication of success, else the function continues at block 2307. In block 2307, the function sets a timer for retrying the sending of the registration message and then returns an indication of error.

Figure 24:
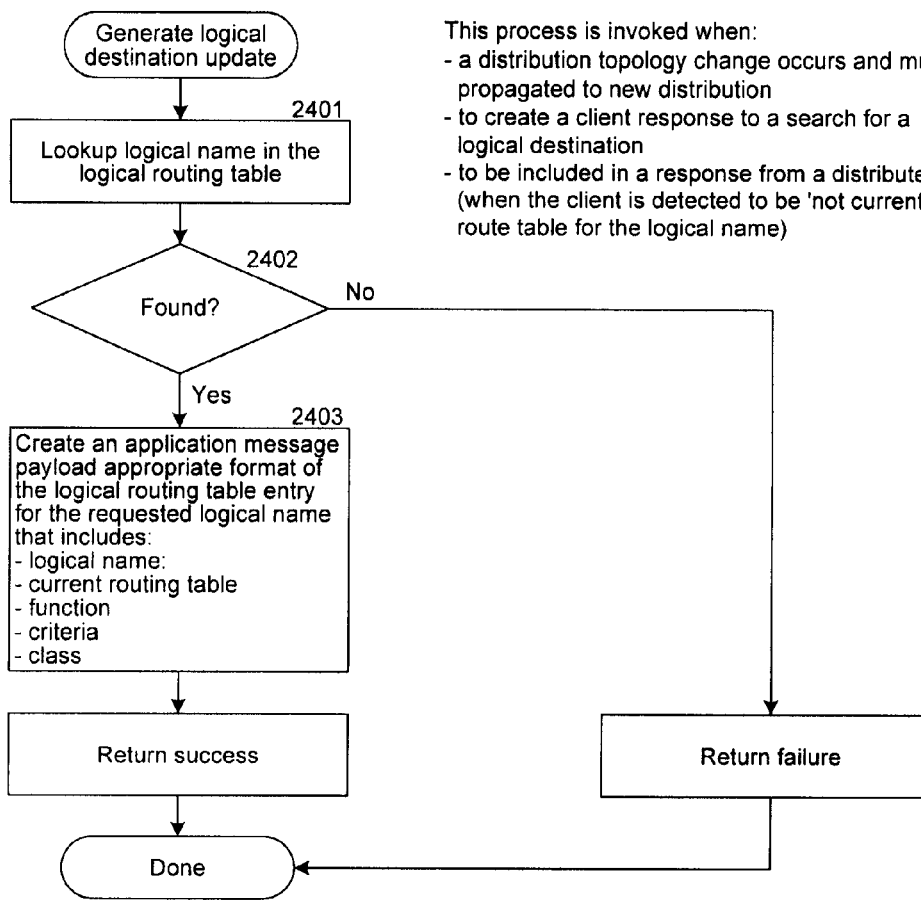
FIG. 24 is a flow diagram illustrating the processing of the generate logical destination update function of the logical routing layer in one embodiment.

FIG. 24 is a flow diagram illustrating the processing of the generate logical destination update function of the logical routing layer in one embodiment. This function is invoked when this node is to respond to a search message for a logical destination or when this node detects that the node identification function of a client node (i.e., a node using the services of an application of this node) is not current. This function is passed a logical name. In block 2401, the function retrieves the entry for the logical name in the logical routing table. In decision block 2402, if an entry was found, then the function continues at block 2403, else the function returns an indication of error. In block 2403, the function creates a message that contains the node identification function and returns an indication of success.

Figure 25A:
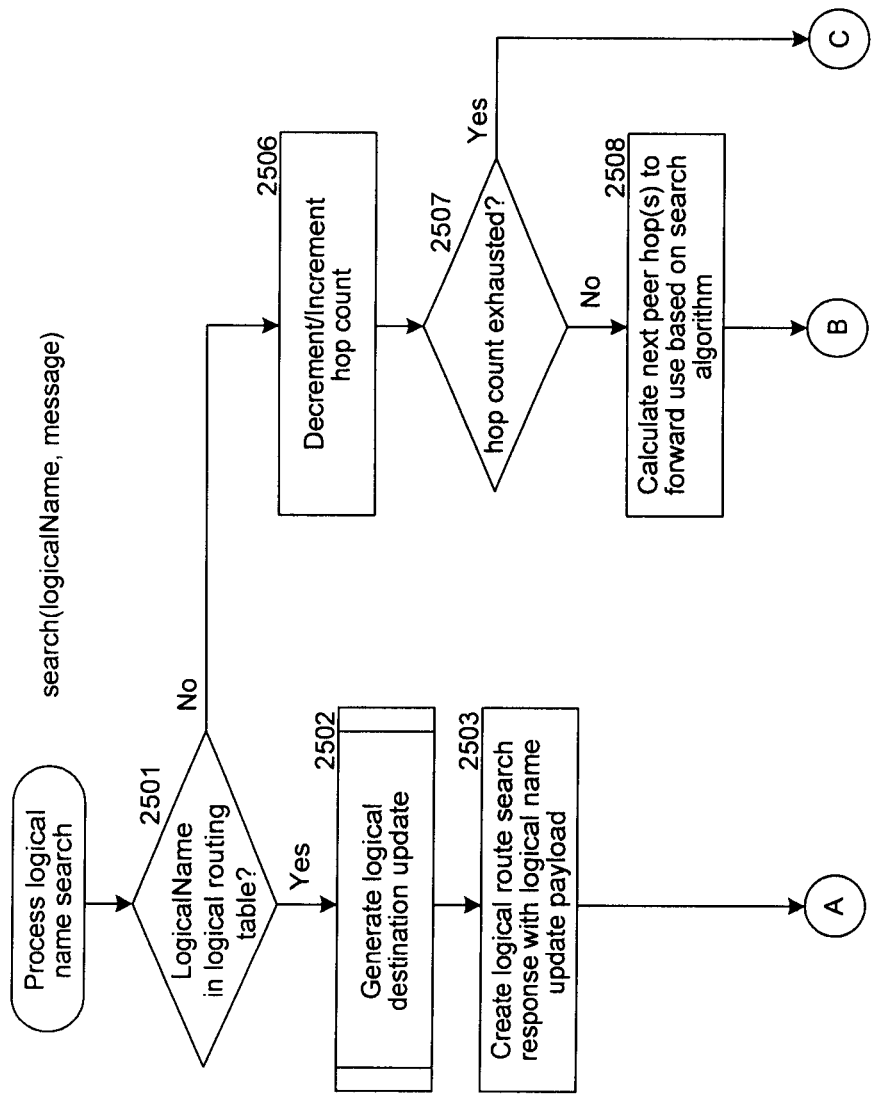
FIG. 25 is a flow diagram illustrating the processing of the process logical name search function of the logical routing layer in one embodiment.
Figure 25B:
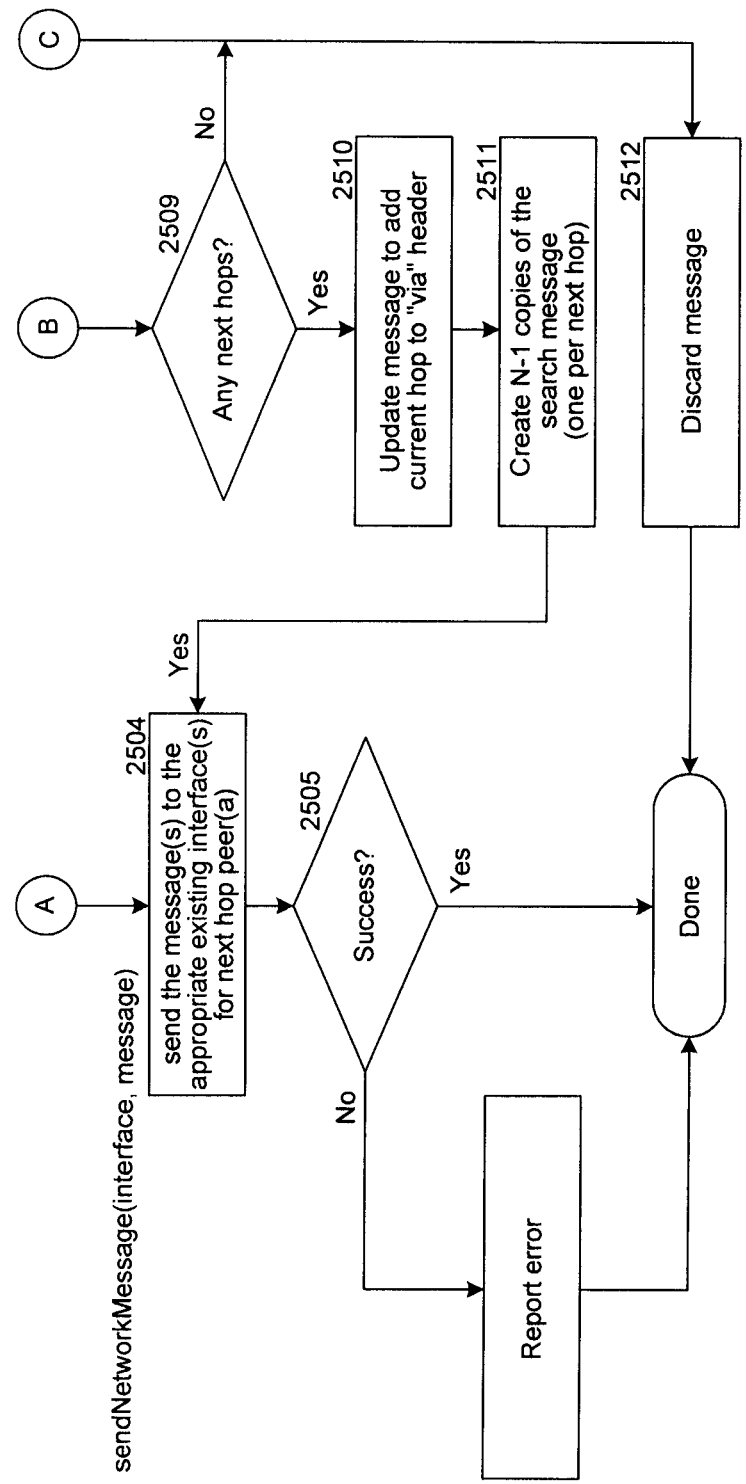

FIG. 25 is a flow diagram illustrating the processing of the process logical name search function of the logical routing layer in one embodiment. The function is passed a logical name and a message. This function is invoked when the physical routing layer receives a logical name search request. In decision block 2501, if the logical name is in the logical routing table, then the function continues at block 2502, else the function continues at block 2506. In block 2502, the function invokes the generate logical destination update function to retrieve and prepare the information (e.g., node identification function) for the passed logical name. In block 2503, the function creates a logical route search response that includes the node identification function. In block 2504, the function sends the response to a peer node to be sent back to the originating node. In decision block 2505, if the response was sent successfully, then the function returns, else the function reports error and then returns. In block 2506, the function decrements the hop count. In decision block 2507, if the hop count is zero, then the function continues at block 2512, else the function continues at block 2508. In block 2508, the function determines the next peer node based on a search algorithm. In decision block 2509, if a peer node was identified, then the function continues at block 2510, else the function continues at block 2512. In block 2510, the function updates the message to add the node identifier of this node. In block 2511, the function creates the copies of the message for each peer node to which the message is to be sent and continues at block 2504 to send a message to each peer node. In block 2512, the function discards the message and then returns.

Figure 26:
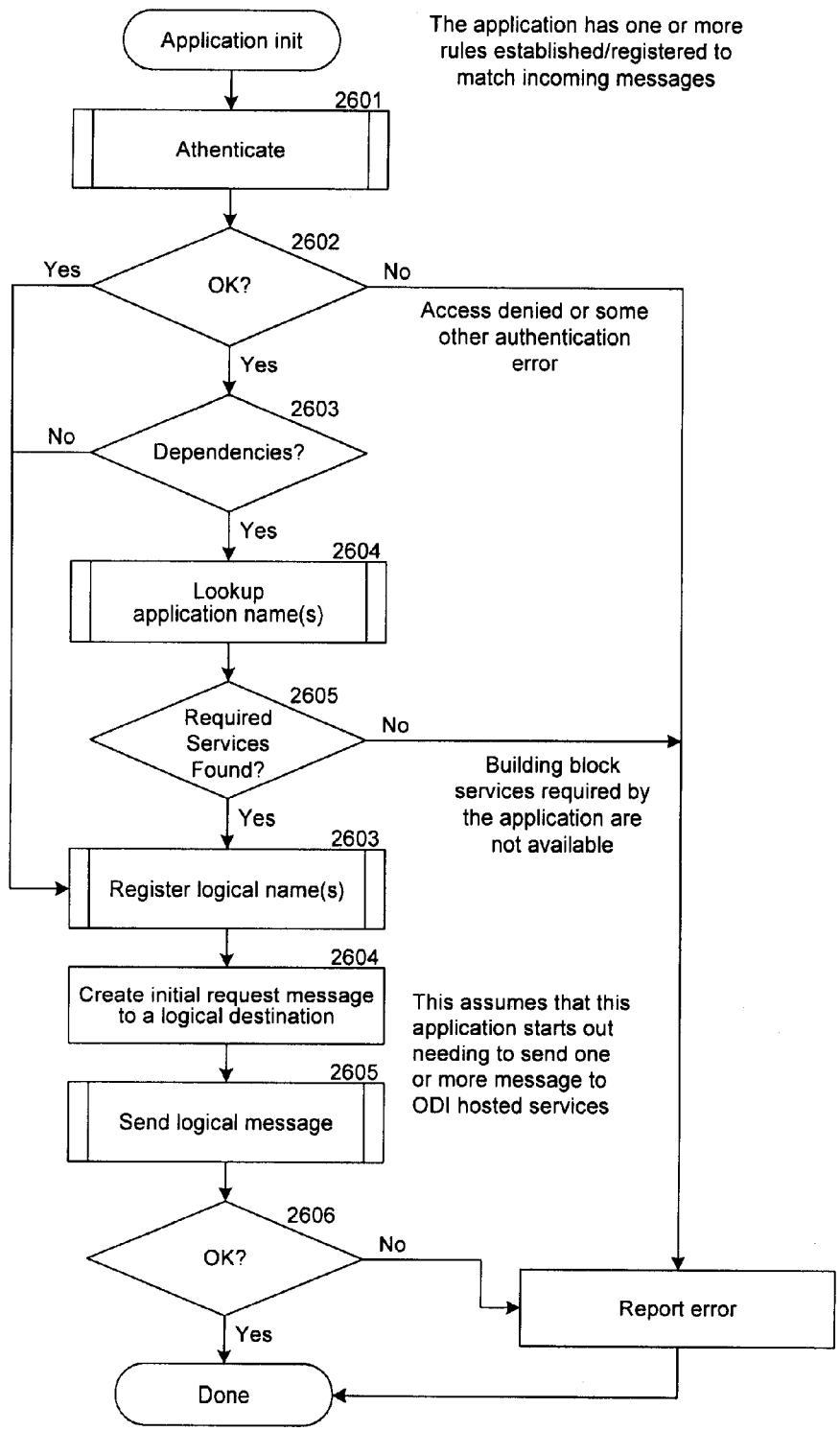
FIG. 26 is a flow diagram illustrating the processing of an application initialization function in one embodiment.

FIG. 26 is a flow diagram illustrating the processing of an application initialization function in one embodiment. This function illustrates the use of the logical routing layer by an application. In block 2601, the function authenticates the application with the server node. In decision block 2602, if the authentication is successful, then the function continues at block 2603, else the function reports an indication of error and completes. In block 2603, the function invokes the register logical names function to register the logical routing map associated with this application. The function also adds entries to the logical routine table for this application. In block 2604, the function creates a request message to be sent to a logical destination. This reflects the actual processing that may be done by the application. In block 2605, the function invokes the send logical message function of the logical routing layer to send a message to the logical destination. In decision block 2606, if the message was successfully sent, then the function completes, else the function reports an error and completes.

Figure 27:
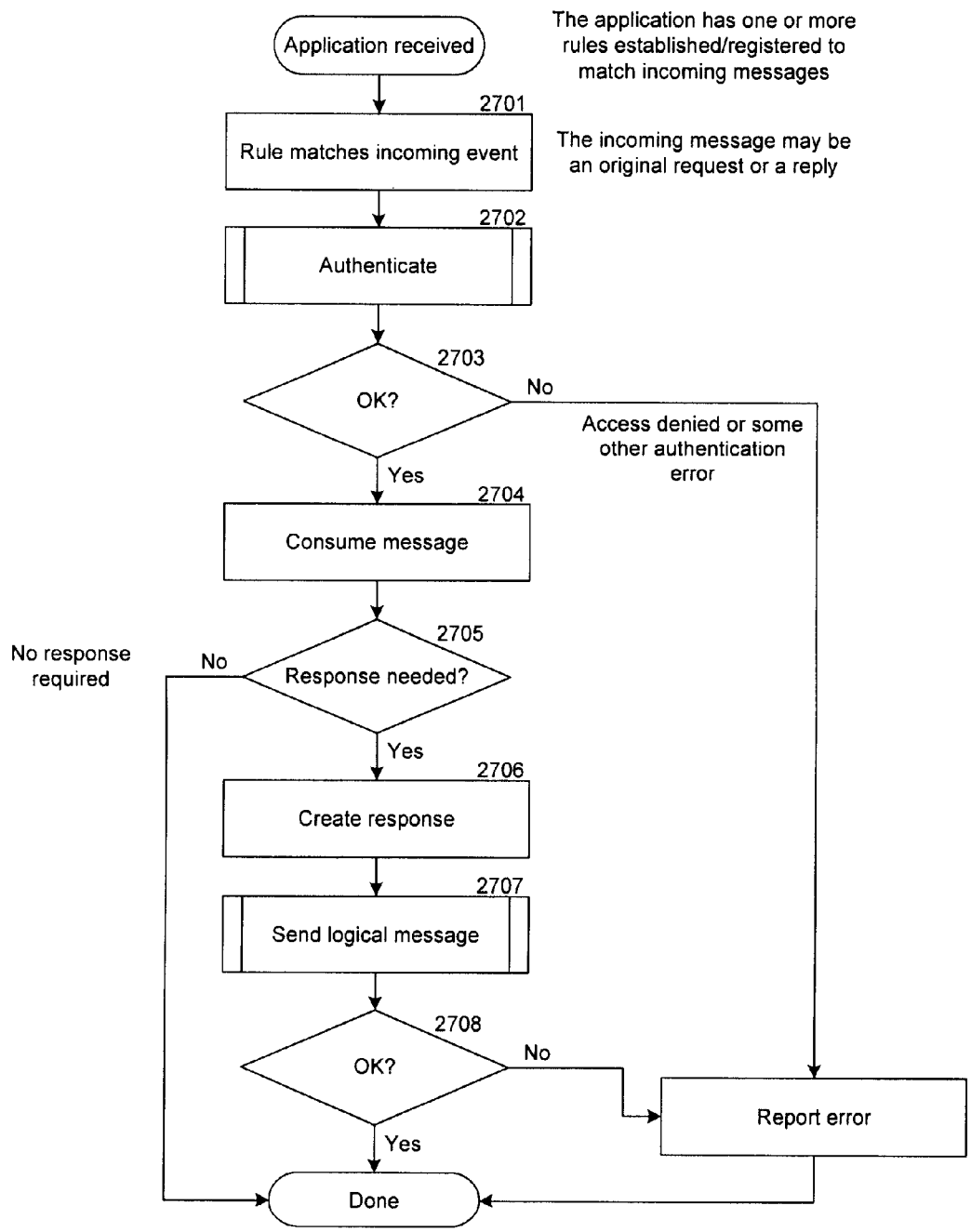
FIG. 27 is a flow diagram illustrating the processing of a function of an application that receives a message from the logical routing layer.

FIG. 27 is a flow diagram illustrating the processing of a function of an application that receives a message from the logical routing layer. In block 2702, the function authenticates the message. In decision block 2703, if the message is authenticated, then the function continues at block 2704, else the function reports an error and then completes. In block 2704, the function consumes the message. In decision block 2705, if a response is to be sent, then the function continues at block 2706, else the function completes. In block 2706, the function creates a response. In block 2707, the function invokes the send logical message function of the logical routing layer to send the response. In decision block 2708, if the sending of the logical message was successful, then the function completes, else the function reports an error and then completes.

From the above description, it will be appreciated that although specific embodiments of the technology have been described for purposes of illustration, various modifications may be made without deviating from the scope of the invention. Further aspects of the technology are described in Appendix A to this specification. Accordingly, the invention is not limited except by the appended claims.

The invention claimed is:

1. A distributed computer system for providing services of a server application executing at a server node to client applications executing at client nodes, comprising:
    an event bus configured to route events sent by client adapters of client applications to a rules engine;
    an activation bus configured to route activations from the rules engine to adapters of applications;
    a first client node having a first client adapter configured to
        detect first events that occur during execution of a first client application, generate for a first event a first event message that is compatible with the event bus, and send, to the rules engine via the event bus, the first event message; and
        receive activations from the rules engine via the activation bus, convert the activations into first client commands specific to the first application, and provide the first client commands to the first application;
    a second client node having a second client adapter configured to
        detect second events that occur during execution of a second client application, generate for a second event a second event message that is compatible with the event bus, and send, to the rules engine via the event bus, the second event message; and
        receive activations from the rules engine via the activation bus, convert the activations into second client commands specific to the second application, and provide the second client commands to the second application;
    a rules engine having a rules repository with rules that specify activations in a rules-engine format to generate based on events in a rules-engine format that are received from adapters of applications, the rules engine configured to receive event messages from the event bus, generate activations for received event messages based on the rules of the rules repository, and send the generated activations to applications via the activation bus; and
    a first server node having
        a first server application; and
        a first server adapter configured to receive via the activation bus a first activation, convert the first activation into a first server command that is compatible with the first server application, and provide the first server command to the first server application; and
    a second server node having
        a second server application; and
        a second server adapter configured to receive via the activation bus a second activation, convert the second activation into a second server command that is compatible with the second server application, and provide the second server command to the second server application.

2. The distributed computer system of claim 1 wherein the first server adapter configured to control the loading of a plug-in module that provides value-added logic for the processing of the first command.

3. The distributed computer system of claim 2 wherein the plug-in modules supplies an indication of destination nodes from which the plug-in is to receive messages to and a set of messages that the plug-in modules is interested in receiving.

4. The distributed computer system of claim 1 wherein the first server adapter is a database adapter that provides an indication of destination nodes from which the first server adapter is to receive messages, acts as a message mulitplexor into external logic and internal database functionality, and translates the received messages to appropriate internal format.

5. The distributed computer system of claim 1 wherein the first server adapter is stored as instructions in a computer-readable medium at the first server node.

6. The distributed computer system of claim 1 wherein the first client adapter is stored as instructions in a computer-readable medium at the first client node.

7. The distributed computer system of claim 1 wherein the event bus includes a node identification function for a logical destination that computes the physical identifier of a destination node.

8. The distributed computer system of claim 7 wherein the node identification function computes the physical identifier based on content of a message.

9. The distributed computer system of claim 7 wherein the node identifier function is provided by the destination node.

10. A method performed by a distributed computer system for providing services of a server application executing at a server node to client applications executing at client nodes, comprising:
routing via an event bus event messages recieved from client adapters of client applications to a rules engine by detecting by a client adapter an event of a client application, generating for the event an event message in a rules-engine format, and sending the event message via the event bus to the rules engine;
providing a rules repository with rules that specify activations in a rules-engine format to generate based on event messages that are received from client adapters of the client applications;
under control of the rules engine,
receiving event messages in the rules-engine format, the event messages being received from client adapters of client applications via the event bus;
generating activations in the rules-engine format for the received event messages based on the rules of the rules repository; and
sending the generated activations to the server application via an activation bus; and
under control of a server adapter executing at the server node, receiving via the activation bus an activation, converting the activation into a command that is compatible with the server application, and providing the command to the server application.

11. The method of claim 10 wherein the server adapter is configured to control the loading of a plug-in module that provides value-added logic for the processing of the command.

12. The method of claim 11 wherein the plug-in modules supplies an indication of destination nodes from which the plug-in is to receive messages and a set of messages that the plug-in modules is interested in receiving.

13. The method of claim 10 wherein the server adapter is a database adapter that provides an indication of destination nodes from which the server adapter is to receive messages, acts as a message mulitplexor into external logic and internal database functionality, and translates the received messages to appropriate internal format.

14. The method of claim 10 wherein the event bus includes a node identification function for a logical destination that computes the physical identifier of the server node.

15. The method of claim 14 wherein the node identification function computes the physical identifier based on content of a message.

16. The method of claim 14 wherein the node identification function is provided by the server node.

17. One or more computer-readable memories storing computer-executable instruction for controlling a computer system to provide services of a server application executing at a server node to client applications executing at client nodes, the instructions comprising instructions that:
receive via an event bus event messages sent from client adapters of client applications, the event messages generated for events of a client application detected by a client adapter and sent from the client adapter to the event bus, the event messages being in a rules-engine format;
provide access to a rules repository with rules that specify activations in a rules-engine format to generate based on event messages that are received from client adapters of the client applications;
under control of a rules engine,
generate activations in the rules-engine format for the received event messages based on the rules of the rules repository; and
send the generated activations to the server application via an activation bus
wherein a server adapter executing at the server node, receives via the activation bus an activation, converts the activation into a command that is compatible with the server application, and provides the command to the server application.

18. The one or more computer-readable memories of claim 17 wherein the server adapter is configured to control the loading of a plug-in module that provides value-added logic for the processing of the command.

19. The one or more computer-readable memories of claim 18 wherein the plug-in modules supplies an indication of destination nodes from which the plug-in is to receive activations and a set of activations that the plug-in modules is interested in receiving.

20. The one or more computer-readable memories of claim 17 wherein the server adapter is a database adapter that provides an indication of destination nodes from which the server adapter is to receive activations, acts as a message mulitplexor into external logic and internal database functionality, and translates the received activations to appropriate internal format.

* * * * *

UNITED STATES PATENT AND TRADEMARK OFFICE
CERTIFICATE OF CORRECTION

| | |
|---|---|
| PATENT NO. | : 8,583,745 B2 |
| APPLICATION NO. | : 12/124825 |
| DATED | : November 12, 2013 |
| INVENTOR(S) | : Rob Bearman et al. |

It is certified that error appears in the above-identified patent and that said Letters Patent is hereby corrected as shown below:

On title page 2, in column 2, item 56 under "Other Publications", line 4, delete "Foo,S.," and insert -- Foods, --, therefor.

On title page 2, in column 2, item 56 under "Other Publications", line 9, delete "Domian" and insert -- Domain --, therefor.

In the Drawings

On sheet 33 of 34, in Figure 26, Reference Numeral 2601, line 1, delete "Athenticate" and insert -- Authenticate --, therefor.

In the Specifications

In column 1, line 18, delete "if" and insert -- of --, therefor.

In column 1, line 25, after "entirety." insert -- This application is related to U.S. Provisional Application No. 60/219,304, entitled "EVENT BUS ARCHITECTURE," filed on July 19, 2000 which is hereby incorporated by reference. --, therefor.

In the Claims

In column 19, line 35, in claim 10, delete "recieved" and insert -- received --, therefor.

Signed and Sealed this
Fifteenth Day of April, 2014

Michelle K. Lee
*Deputy Director of the United States Patent and Trademark Office*